United States Patent
Fei et al.

(10) Patent No.: US 12,441,737 B2
(45) Date of Patent: Oct. 14, 2025

(54) MANUFACTURE OF COMPOUNDS AND COMPOSITIONS FOR INHIBITING THE ACTIVITY OF SHP2

(71) Applicant: Novartis AG, Basel (CH)

(72) Inventors: Zhongbo Fei, Shanghai (CN); Huanqing Jia, Changshu (CN); Wei Li, Shanghai (CN); Jianhua Wang, Changshu (CN); Huangchao Yu, Suzhou (CN)

(73) Assignee: NOVARTIS AG, Basel (CH)

( * ) Notice: Subject to any disclaimer, the term of this patent is extended or adjusted under 35 U.S.C. 154(b) by 339 days.

(21) Appl. No.: 18/004,313

(22) PCT Filed: Jul. 6, 2021

(86) PCT No.: PCT/IB2021/056057
§ 371 (c)(1),
(2) Date: Jan. 5, 2023

(87) PCT Pub. No.: WO2022/009098
PCT Pub. Date: Jan. 13, 2022

(65) Prior Publication Data
US 2023/0374029 A1    Nov. 23, 2023

(30) Foreign Application Priority Data

Jul. 8, 2020   (WO) ................ PCT/CN2020/100882
May 17, 2021   (WO) ................ PCT/CN2021/094139

(51) Int. Cl.
C07D 491/107    (2006.01)
(52) U.S. Cl.
CPC ................ *C07D 491/107* (2013.01)
(58) Field of Classification Search
CPC .................................. C07D 491/107
USPC ........................................ 544/230
See application file for complete search history.

(56) References Cited

FOREIGN PATENT DOCUMENTS

| | | | |
|---|---|---|---|
| CN | 103922933 A | 7/2014 | |
| CN | 105916845 A | 8/2016 | |
| CN | 110713447 A | 1/2020 | |
| WO | 2015107494 A1 | 7/2015 | |
| WO | 2015107495 A1 | 7/2015 | |
| WO | WO 2015/107493 A1 | 7/2015 | |
| WO | WO 2016/203404 A1 | 12/2016 | |
| WO | WO 2016/203405 A1 | 12/2016 | |
| WO | WO 2016/203406 A1 | 12/2016 | |
| WO | WO 2017/211303 A1 | 12/2017 | |
| WO | WO 2017/216706 A1 | 12/2017 | |
| WO | WO 2018/013597 A1 | 1/2018 | |
| WO | WO 2018/130928 A1 | 7/2018 | |
| WO | WO 2018/136265 A1 | 7/2018 | |
| WO | WO 2018/172984 A1 | 9/2018 | |
| WO | WO 2019/075265 A1 | 4/2019 | |
| WO | 2020065452 A1 | 4/2020 | |

(Continued)

OTHER PUBLICATIONS

International Search Report and Written Opinion for International Application No. PCT/CN2020/100882, mailed Apr. 9, 2021, 10 pages.

(Continued)

*Primary Examiner* — Kristin A Vajda
(74) *Attorney, Agent, or Firm* — LATHROP GPM LLP; Brian C. Trinque

(57) ABSTRACT

The present invention relates to a method for the manufacture of a compound of Formula I or a pharmaceutically acceptable salt, acid co-crystal, hydrate or other solvate thereof, said method comprising reacting a compound of the formula II with a compound of the formula III according to the following reaction scheme: wherein LG, A, n, m and p are as defined in the Summary of the Invention, said manufacture including the manufacture and use of a compound of the formula VI; wherein $R_1$ is a secondary amino protecting group and $R_5$ is unsubstituted or substituted alkyl, unsubstituted or substituted cycloalkyl or unsubstituted or substituted aryl.

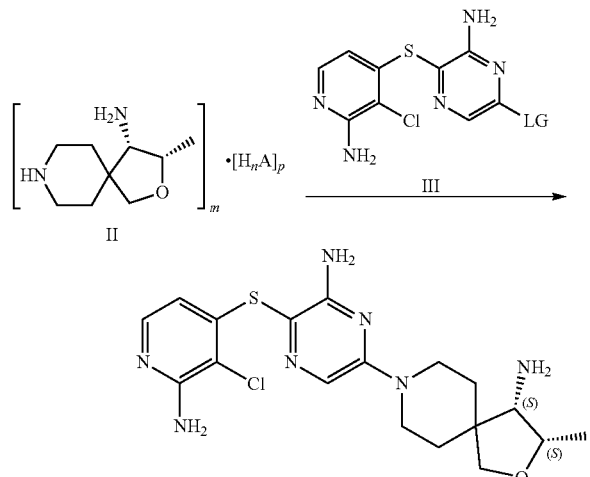

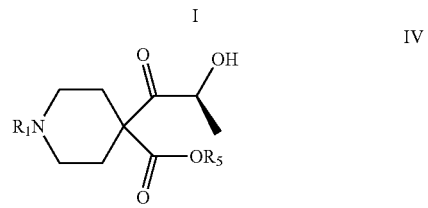

12 Claims, No Drawings

(56) References Cited

FOREIGN PATENT DOCUMENTS

| WO | 2020065453 A1 | 4/2020 |
| WO | WO 2020/165732 A1 | 8/2020 |
| WO | WO 2020/165733 A1 | 8/2020 |
| WO | WO 2020/165734 A1 | 8/2020 |
| WO | 2020177653 A1 | 9/2020 |
| WO | WO 2021/171261 A1 | 9/2021 |
| WO | WO 2021/224867 A1 | 11/2021 |
| WO | WO 2022/009098 A1 | 1/2022 |

OTHER PUBLICATIONS

International Search Report and Written Opinion for International Application No. PCT/CN2021/094139, mailed Aug. 20, 2021, 9 pages.

International Search Report and Written Opinion for International Application No. PCT/IB2021/056057, mailed Aug. 10, 2021, 10 pages.

Lamarche et al., "Identification of TNO155. An Allosteric SHP2 Inhibitor for the Treatment of Cancer", *Journal of Medicinal Chemistry* 63(22):13578-13594 (2020).

European Office Action for EP Application No. 19773559.0, dated May 10, 2023, 5 pages.

Cherepakhin, "Catalytic synthesis of alkyl (S,S)-O-Lactyllactates: Efficiency in action", *Catalysis Communications* 106:36-39 (2018).

Dictionary of Chemistry and Chemical Technology, Editorial Committee of "Dictionary of Chemistry and Chemical Technology", Dictionary Editorial Department of Chemical Industry Press, Chemical Industry Press, 1st Edition, p. 1157 (Jan. 2003).

Database PUBCHEM, PubChem CID: 57925884, dated Aug. 19, 2012.

Knunyants et al., Chemical Encyclopaedic Dictionary, 12 pages (1983).

Knunyants et al., Chemical Encyclopedia, 5 pages (1990).

Kubasov, "Chemical Kinetics and Catalysis Part 1: Statistically equilibrial phenomenological kinetics, Part 1. Phenomenological kinetics", pp. 2-3 (2004).

Pinto et al., "Thermoanalytical studies of carbamazepine; hydration/dehydration, thermal decomposition, and sold phase transitions", *Brazilian Journal of Pharmaceutical Sciences* 50(40):877-884 (2014).

Smit et al., "Organic Synthesis: Science and Art", Chapter 2, p. 64 (2001).

International Search Report and Written Opinion for International Application No. PCT/IB2019/057863, mailed Feb. 6, 2020, 19 pages.

Palamidessi et al., "Pyrazine derivatives. X. Trichloropyrazine", Farmaco, Edizione Scientifica, 21(11):805-810, 1966, XP009518495.

MANUFACTURE OF COMPOUNDS AND COMPOSITIONS FOR INHIBITING THE ACTIVITY OF SHP2

BACKGROUND

Field of the Invention

The present invention relates to a process for the manufacture of a compound capable of inhibiting the activity of SHP2 and intermediates useful therein.

Background of the Invention

The Src Homolgy-2 phosphatase (SHP2) is a non-receptor protein tyrosine phosphatase encoded by the PTPN11 gene that contributes to multiple cellular functions including proliferation, differentiation, cell cycle maintenance and migration. SHP2 is involved in signaling through the Ras-mitogen-activated protein kinase, the JAK-STAT or the phosphoinositol 3-kinase-AKT pathways.

The compound with the name (3S,4S)-8-(6-amino-5-((2-amino-3-chloropyridin-4-yl)thio)pyrazin-2-yl)-3-methyl-2-oxa-8-azaspiro[4.5]decan-4-amine, which has the formula I:

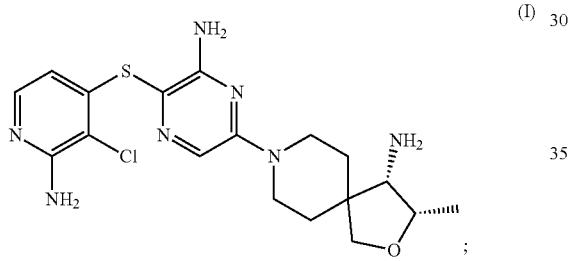

as well as pharmaceutically acceptable salts thereof are described in WO2015/107495 A1 as an inhibitor of SHP2. Various therapeutic and treatment methods are also described.

The Src Homolgy-2 phosphatase (SHP2) is a non-receptor protein tyrosine phosphatase encoded by the PTPN11 gene that contributes to multiple cellular functions including proliferation, differentiation, cell cycle maintenance and migration. SHP2 is involved in signaling through the Ras-mitogen-activated protein kinase, the JAK-STAT or the phosphoinositol 3-kinase-AKT pathways.

SHP2 has two N-terminal Src homology 2 domains (N—SH2 and C—SH2), a catalytic domain (PTP), and a C-terminal tail. The two SH2 domains control the subcellular localization and functional regulation of SHP2. The molecule exists in an inactive, self-inhibited conformation stabilized by a binding network involving residues from both the N—SH2 and PTP domains. Stimulation by, for example, cytokines or growth factors leads to exposure of the catalytic site resulting in enzymatic activation of SHP2.

Mutations in the PTPN11 gene and subsequently in SHP2 have been identified in several human diseases, such as Noonan Syndrome, Leopard Syndrome, juvenile myelomonocytic leukemias, neuroblastoma, melanoma, acute myeloid leukemia and cancers of the breast, lung and colon. SHP2, therefore, represents a highly attractive target for the development of novel therapies for the treatment of various diseases. The compound that can be manufactured according to the present invention fulfills the need of small molecules that inhibit the activity of SHP2.

WO 2020/065452 A1 describes three methods for the manufacture of the compound of the formula I which can be characterized by the following reaction schemes (for further details see WO 2020/065452 A1). These synthesis methods, while essentially feasible, can be improved upon (for example, using less material and producing less waste, while improving reaction safety). The methods can be summarized substantially as follows:

Scheme 1: This shows the three Routes B to D disclosed in WO 2020-065452

Route B

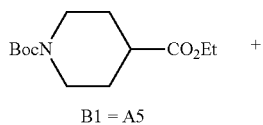

B1 = A5

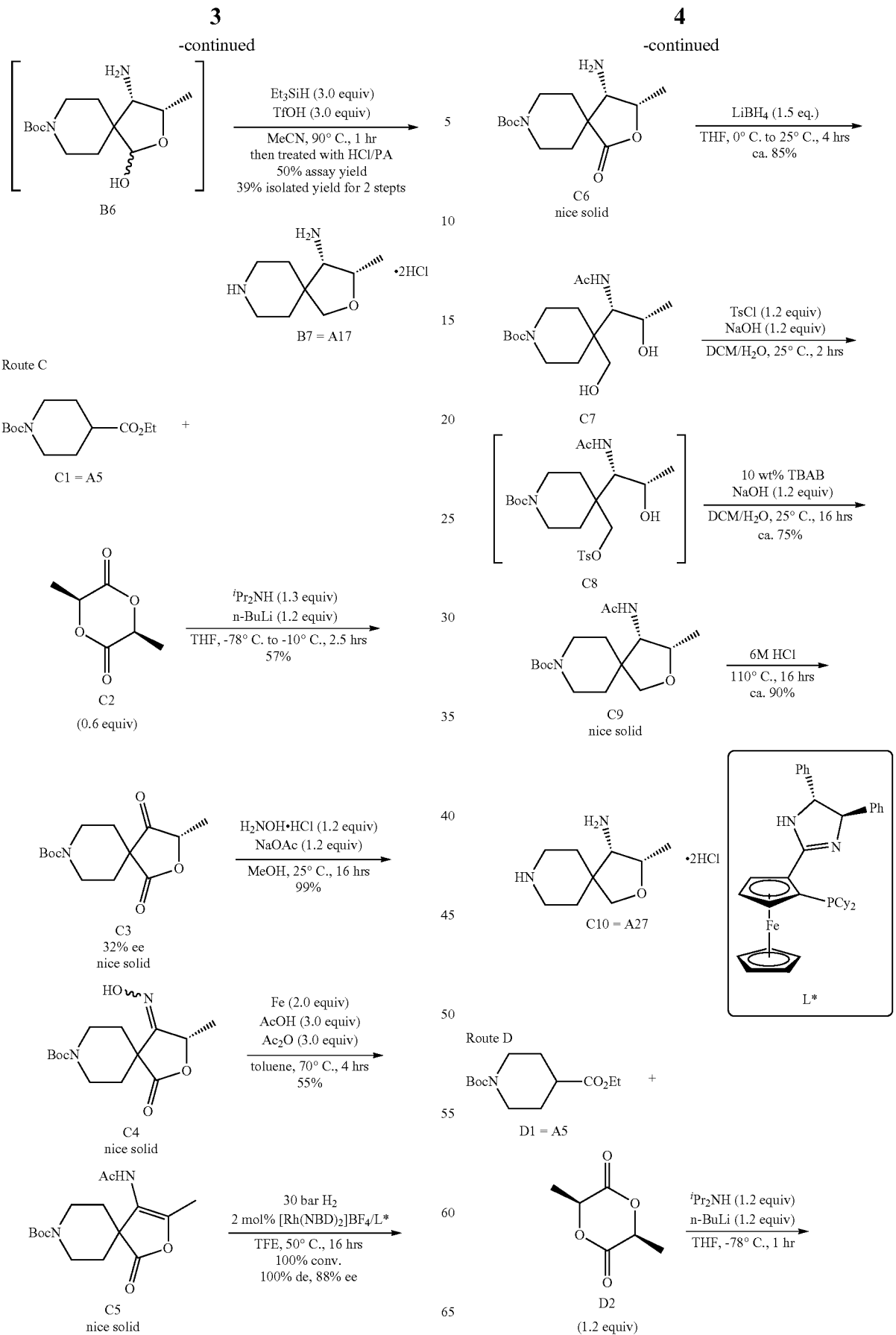

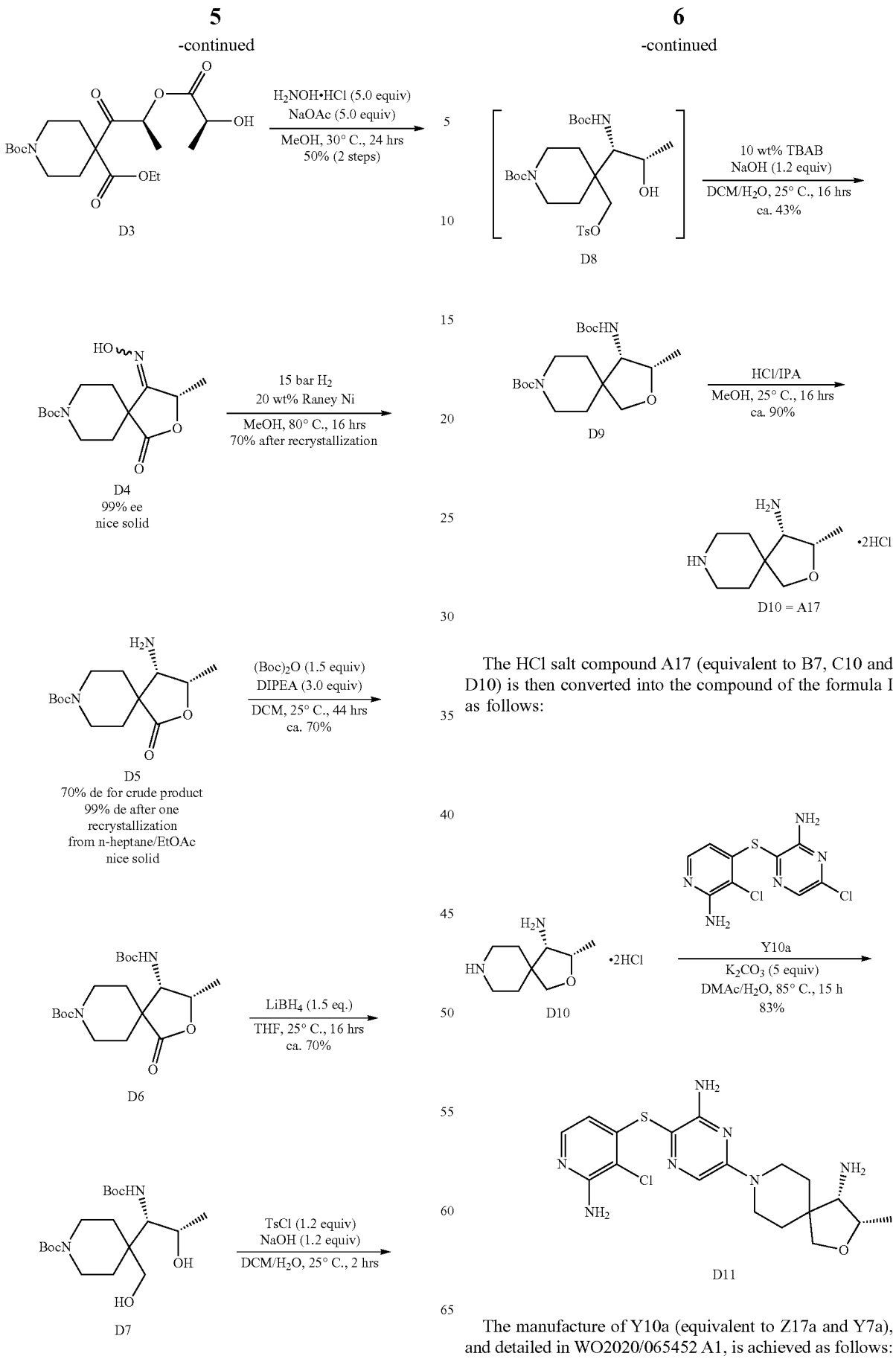
The HCl salt compound A17 (equivalent to B7, C10 and D10) is then converted into the compound of the formula I as follows:
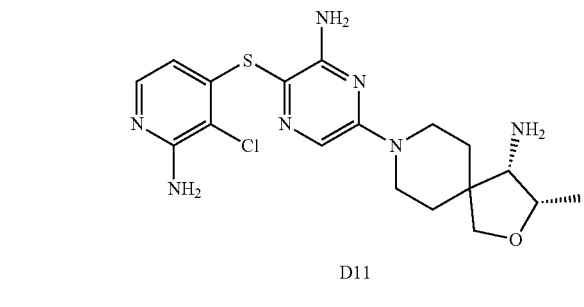
The manufacture of Y10a (equivalent to Z17a and Y7a), and detailed in WO2020/065452 A1, is achieved as follows:

Variant (i):
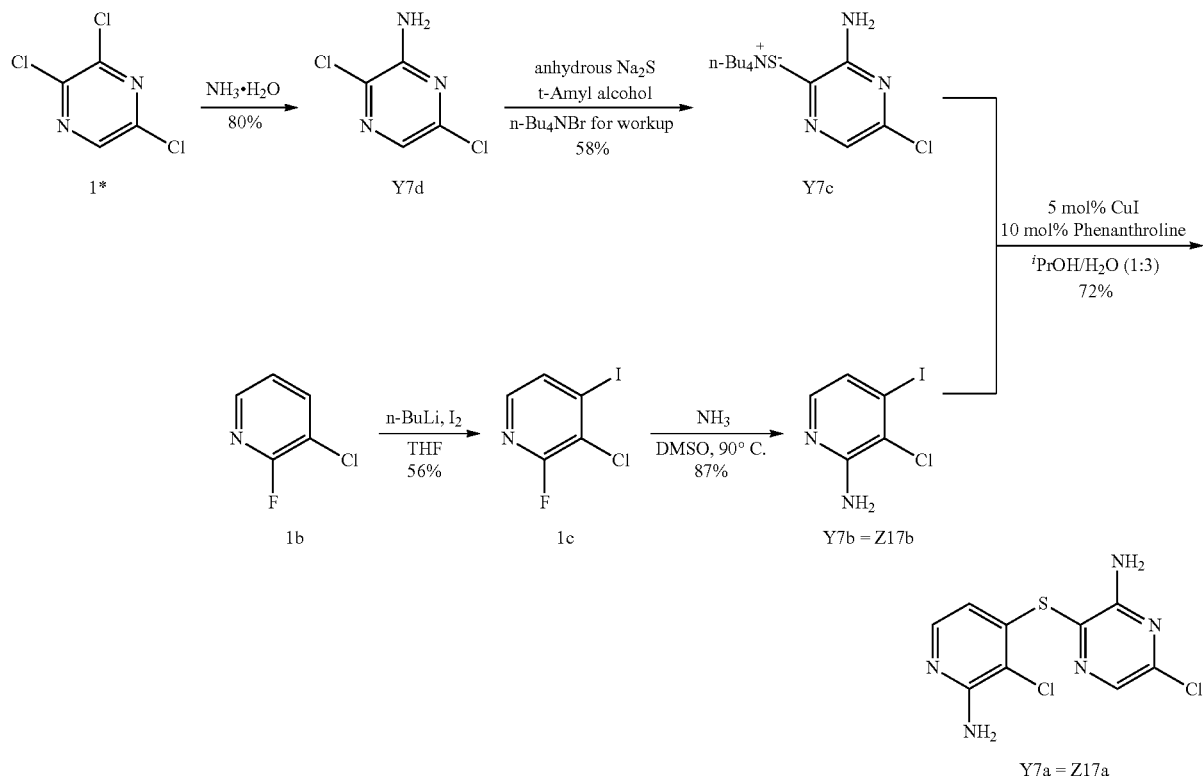
or alternatively by the following route, Variant (ii):
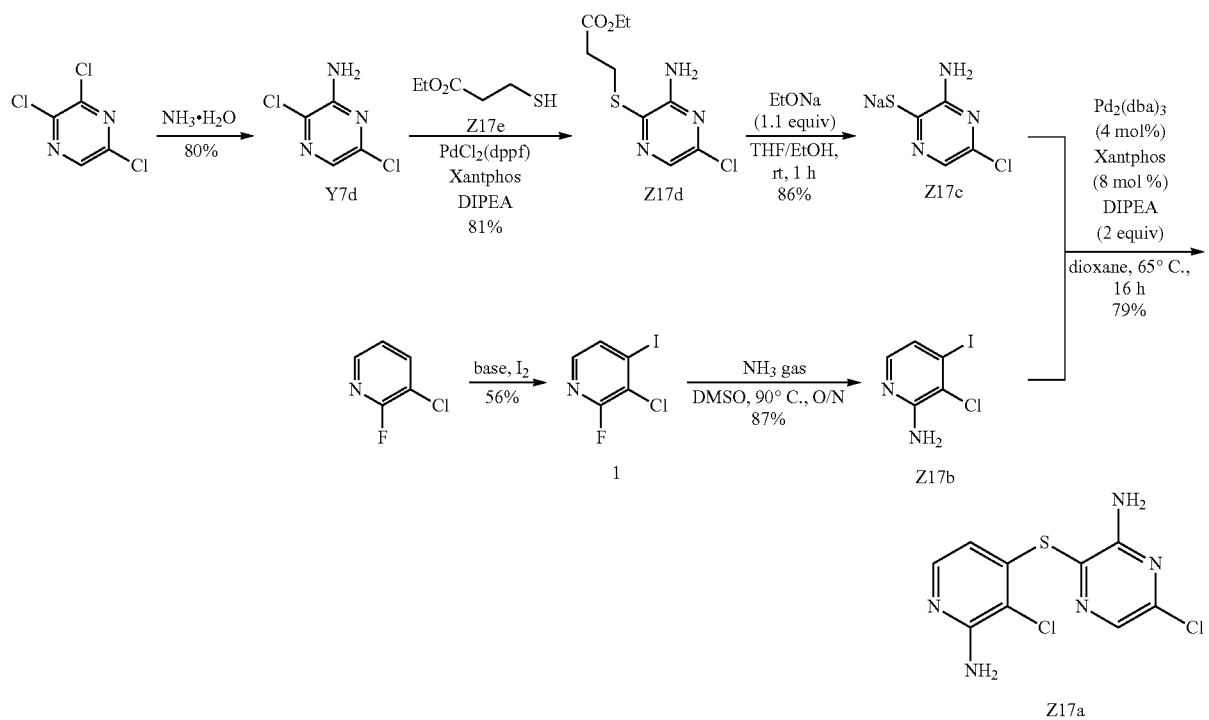

Yet alternatively, the compound Z17a is made according to the following route (variant (iii)):

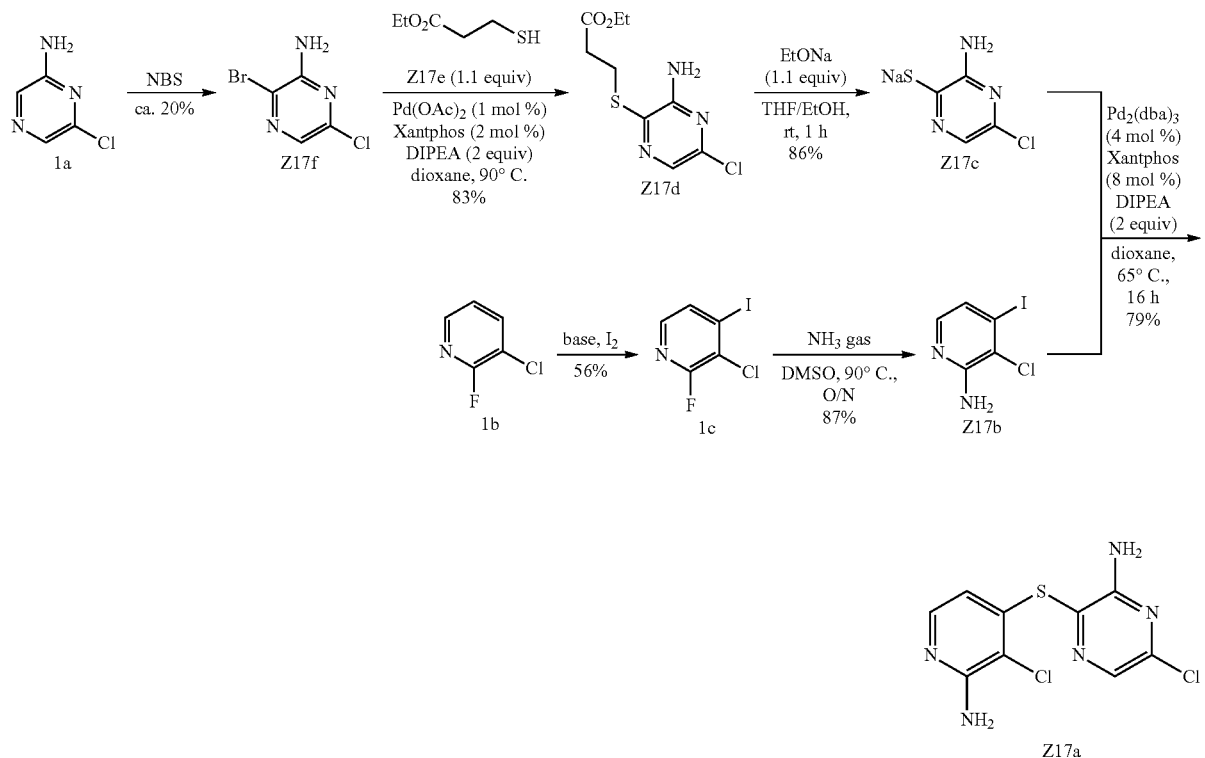

Each of the above routes are suitable for the commercial synthesis of a compound of formula I. However, the synthesis route B (above) requires the use of equivalent (equimolar) amounts of lactone B2 (equivalent to C2 and D2) to get B3. This represents a relatively large quantity of B2 for commercial manufacture particularly because it is used in the first step of the overall synthesis.

In addition, in order to achieve a good conversion of the compound from B3 to B4, at least a five fold molar excess (5 equivalents) of hydroxylamine hydrochloride is required. This is less than ideal for a large scale synthesis due to the thermo safety risk.

Surprisingly, the present invention overcomes both the large quantities of material requirement and the thermo safety risk by manufacturing B4 using a new intermediate B3' with a chemical structure uniquely distinct from B3 and C3.

Less material is required in this improved synthesis to synthesize B4. Firstly, much less of the hydroxylamine hydrochloride is required (much less than 5 equivalents) to accomplish the reaction from B3' to B4. Additionally, less of the L-lactide B2, approximately half of the relative (equivalent) amount of B2 is required for the reaction with B1 (equivalent to A5).

This new way of manufacture of intermediate B4, in a specific form not meaning to be limiting to the scope of the invention, can be described by the following reaction scheme, SCHEME A:

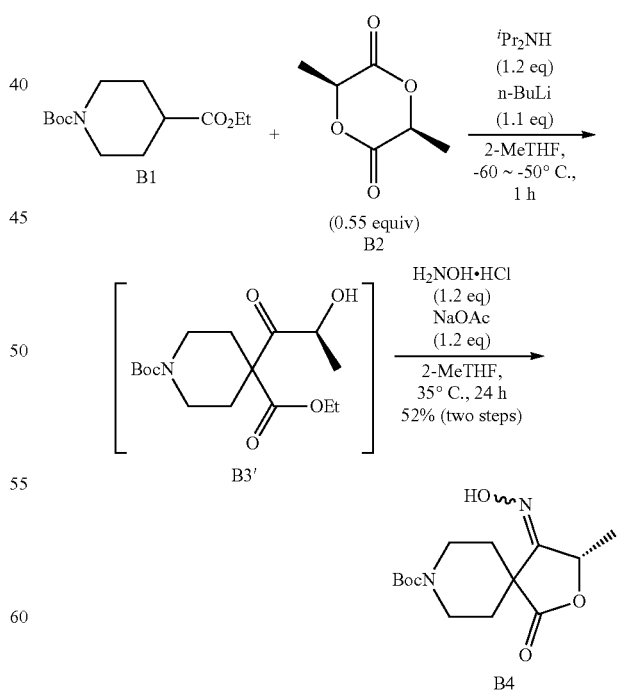

The reaction via the novel intermediate B3' (1-(tert-butyl) 4-ethyl (S)-4-(2-hydroxypropanoyl)piperidine-1,4-dicarboxylate) thus allows for a drastic improvement of the reaction for the manufacture ultimately culminating in the synthesis of the compound of formula I.

A further improvement of the synthesis of the compound of formula I disclosed in WO 2020/065452 A1 relates to the variant (i) for the manufacture of the compound Y7c (above). The anhydrous Na₂S used in this reaction is pyrophoric and not commercially available in large scale. In addition, the use of the tetrabutylammonium salt required for work-up is poorly biodegradable.

While the compound Z17c could also be manufactured via variants (ii) or (iii) above, these also have the disadvantage of requiring a thiol compound and quite strong reaction conditions and strong reagents, e.g. using sodium ethoxylate.

This issue, however, can be resolved in a surprising and convenient way which, in a specific form not meaning to be limiting to the scope of the invention, can be described by the following reaction scheme, SCHEME B:

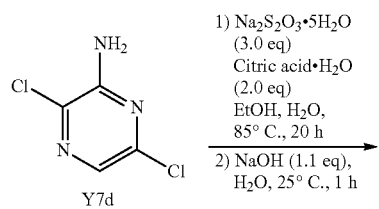

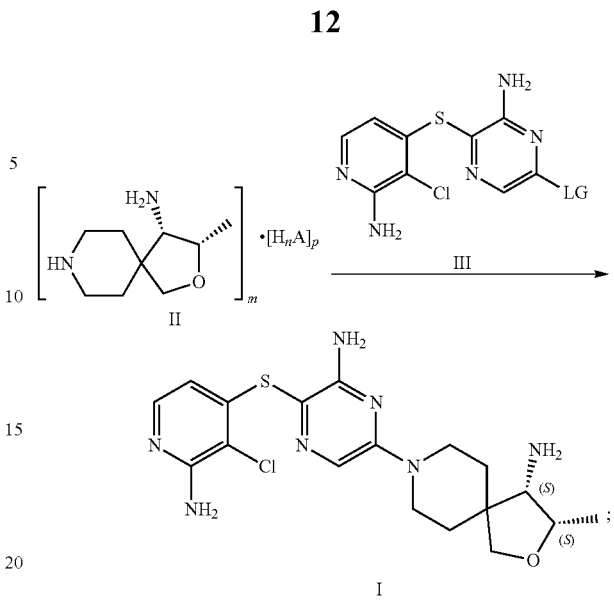

(Note Y7c' corresponds to Z17c in variants (ii) and (iii) above). Instead sodium sulfide is replaced with sodium thiosulfate. Sodium thiosulphate is not pyrophoric and is available in large scale. In addition, the materials used are cheaper and uses a more environmentally friendly solvent. The workup is simplified and the reaction mixture is free of tetrabutylammonium salt and odorless.

SUMMARY OF THE INVENTION

In one aspect, the present invention provides a method for the manufacture of a compound of Formula I as mentioned above, or a pharmaceutically acceptable salt, acid co-crystal, hydrate or other solvate thereof.

In a further aspect, the present invention provides a method for the manufacture of a compound of Formula I as mentioned above, or a pharmaceutically acceptable salt, acid co-crystal, hydrate or other solvate thereof (these variants are also included where subsequently only a compound of the formula I is referred to), said method comprising reacting a compound of the formula II with a compound of the formula III according to the following reaction scheme:

wherein LG is a leaving group, especially chloro, A is the anion of a protic acid, especially a Cl anion, and n, m and p are integers, preferably 1, 2 or 3, so that the salt of the formula II is electrically neutral, preferably m is 1, n is 1 and p is 2; where the compound of the formula II is preferably obtained either (i) by deprotecting or (ii) by reducing a compound of the formula IV:

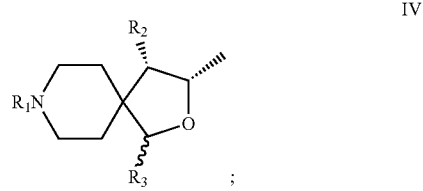

wherein in case (i) $R_1$ is a secondary amino protecting group (meaning a protecting group protecting secondary amino), especially tert-butoxycarbonyl, and $R_2$ is a protected amino group, especially acetylamino or tert-butoxycarbonylamino, and $R_3$ is hydrogen, or in case (ii) $R_1$ is a secondary amino protecting group, preferably tert-butoxycarbonyl, $R_2$ is amino and $R_3$ is hydroxyl, and if required (that is, if the acid is not already present for example due to the deprotection) reacting the resulting compound of the formula II*:

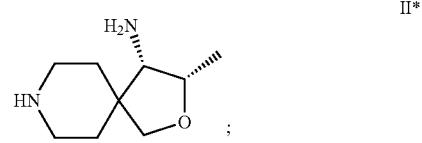

with an acid of the formula $H_nA$ (as described herein) to yield the compound of the formula II.

In both cases (i) and (ii) just mentioned, in a preferred independent second aspect of the invention (meaning that the reaction from the compound of the formula V up to and including to the compound of formula VI) is an own invention embodiment), or as part of the manufacture of the compound of the formula I, the manufacturing of a compound of the formula II, in a first step preferably followed by the further steps defined by further invention embodiments defined below, comprises reacting a compound of the formula V:

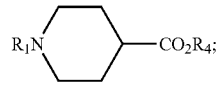

wherein $R_1$ is a secondary amino protecting group, especially tert-butoxycarbonyl, and $R_4$ is a carboxyl (—COOH) protecting group, especially alkyl, such as ethyl, in the presence of a strong base with L-lactide of the formula:

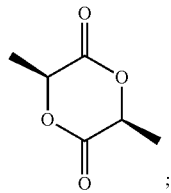

to yield a compound of the formula VI:

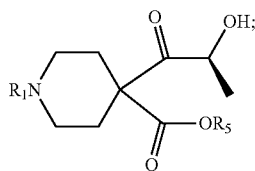

wherein $R_1$ is as defined for a compound of the formula IV and $R_5$ is unsubstituted or substituted alkyl, unsubstituted or substituted cycloalkyl or unsubstituted or substituted aryl, especially ethyl.

This reaction of the second embodiment of the invention as such is also an embodiment of the invention.

As a further independent embodiment of the invention or preferably in a further step, a compound of the formula VI as just described is cyclized with hydroxylamine, or a salt thereof, to yield a hydroxylamine compound of the formula VII, respectively:

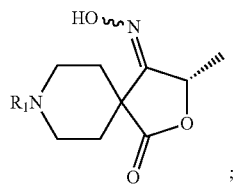

wherein $R_1$ is as defined for a compound of the formula IV.

The two reaction steps of the compound of the formula V with L-Lactide to yield the compound of formula VI and the subsequent cyclization with hydroxylamine to yield the compound of the formula VII form also an independent and important invention embodiment.

As a further independent embodiment, in a further step, a compound of the formula VII is either (a-i) hydrogenated to yield an amino compound of the formula VIII:

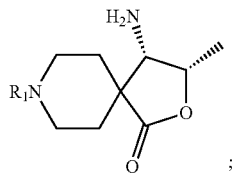

wherein $R_1$ is as defined for a compound of the formula IV, or (a-ii) acylated (with an amino protecting group inserting agent, e.g. an acetic anhydride or di-tertbutyl dicarbonate) under reducing conditions to yield a compound of the formula VIII*:

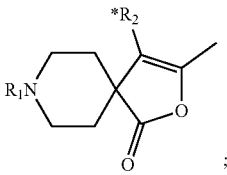

wherein $R_1$ is as defined for a compound of the formula IV and $*R_2$ is acylated amino (=acyl protected amino; preferably acetylamino).

In another preferred embodiment, in a further step after reaction (a-i) just described, a compound of the formula VIII is either (b-i) reduced to yield a compound of the formula IX:

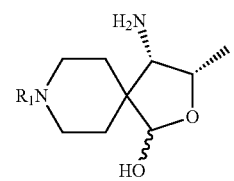

wherein $R_1$ is as defined for a compound of the formula IV, preferably tert-butoxycarbonyl, which compound is a compound of the formula IV wherein $R_1$ is a secondary amino protecting group, especially tert-butyoxycarbonyl, $R_2$ is amino and $R_3$ is hydroxyl; where the reducing step (ii) mentioned for a compound of the corresponding formula IV above falling under the definition of the compound of formula IX is preferably in a further step, conducted using a trialkylsilane, to yield, after subsequent addition of an acid of the formula $H_nA$ as defined above, especially HCl, a compound of the formula II as described above;

or (c-i), the compound of the formula VIII is, as a further invention embodiment, in a further step reacted with an amino protecting group inserting compound, especially $(Boc)_2O$, to yield a compound of the formula X:

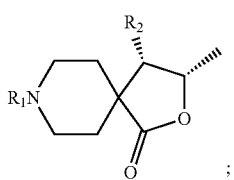

X wherein $R_1$ is as defined for a compound of the formula IV and $R_2$ is a protected amino group, especially tert-butoxycarbonylamino, which compound of formula X is, preferably in a further step, reduced to a compound of the formula XI:

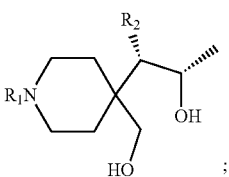

XI wherein $R_1$ is as defined for a compound of the formula IV and $R_2$ is a protected amino group, especially tert-butoxycarbonylamino; which compound of formula XI, preferably in a further step, is reacted at the hydroxy of the hydroxymethyl group (directly bound to the ring) with a leaving group forming agent of the formula LG*-X in which LG* is an electrophilic radical capable, with the hydroxy to which it is bound, of forming a leaving group LG2, especially tosyloxy or preferably 2,4,6-triisopropylbenzenesulfonyl)oxy, and X is halogen, especially chloro, to yield a compound of the formula XII:

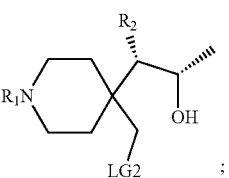

XII wherein $R_1$ is as defined for a compound of the formula IV, $R_2$ is a protected amino group, especially tert-butoxycarbonylamino, and LG2 is a leaving group, especially tosyloxy or preferably 2,4,6-triisopropylbenzenesulfonyl)oxy;

which compound of formula XII is then, in a further invention embodiment, in a further step cyclized under basic conditions to yield a compound of the formula XIII:

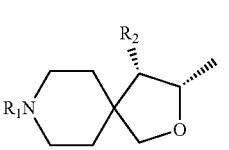

XIII wherein $R_1$ is a secondary amino protecting group, especially tert-butoxycarbonyl, and $R_2$ is a protected amino group, especially tert-butoxycarbonylamino, which is a compound of the formula IV wherein $R_1$ is a secondary amino protecting group, especially tert-butyoxycarbonyl, and $R_2$ is a protected amino group, especially tert-butoxycarbonylamino, and $R_3$ is hydrogen, where the deprotecting step (i) mentioned for a compound of the corresponding formula IV above of the compound of formula XIII is preferably, in a further invention embodiment, in a further step conducted using an acid $H_nA$ as defined for a compound of the formula II to yield a compound of the formula II as described above.

In another preferred embodiment, in a further step after reaction (a-ii) described above, a compound of the formula VIII* is in a further reaction (b-ii) hydrogenated in the presence of a chiral hydrogenation catalyst to yield a compound of the formula X*:

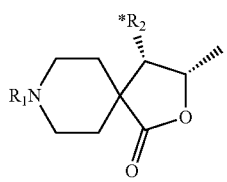

X* wherein $R_1$ is as defined for a compound of the formula IV and *$R_2$ is an acylated amino group, especially acetylamino, which compound of formula X* is, in a further invention embodiment, in a further step reduced to a compound of the formula XI*:

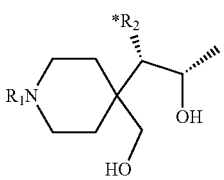

XI* wherein $R_1$ is as defined for a compound of the formula IV and *$R_2$ is an acylated amino group, especially acetylamino;

which compound of formula XI* is, in a further invention embodiment, in a further step reacted at the hydroxy of the hydroxymethyl group (the one directly bound to the ring in formula XI*) with a leaving group forming agent of the formula LG*-X in which LG* is an electrophilic radical capable of forming, with the hydroxy to which it is bound, a leaving group LG2, especially tosyloxy, and X is halogen, especially chloro, to yield a compound of the formula XII*:

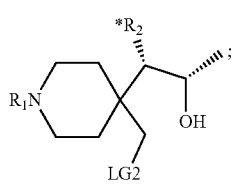

XII* wherein $R_1$ is as defined for a compound of the formula IV, $R_2$ is a protected amino group, especially acetylamino, and LG2 is a leaving group, especially tosyloxy;

which compound of formula XII* is then, in a further invention embodiment, in a further step cyclized under basic conditions to yield a compound of the formula XIII*:

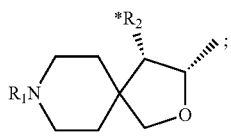

in which $R_1$ is a secondary amino protecting group, especially tert-butoxycarbonyl, and *$R_2$ is an acylated amino group, especially acetylamino, which corresponds to a compound of the formula IV wherein $R_1$ is a secondary amino protecting group, especially tert-butoxycarbonyl, $R_2$ is an acylated (=acyl protected) amino group, especially acetylamino, and $R_3$ is hydrogen; where the deprotecting step (i) mentioned for a compound of the corresponding formula IV above (where deprotecting here means deacylating) of the compound of formula XIII* is preferably, in a further invention embodiment, in a further step conducted using an acid $H_nA$ as defined for a compound of the formula II to yield a compound of the formula II as described above.

The following novel key intermediate also represent an own invention embodiment:

A compound of the formula VI:

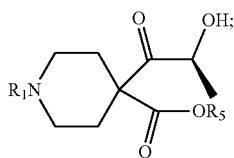

wherein $R_1$ is as defined for a compound of the formula IV, especially tert-butoxycarbonyl, and $R_5$ is unsubstituted or substituted alkyl, unsubstituted or substituted cycloalkyl or unsubstituted or substituted aryl, especially ethyl; or a salt thereof.

A further embodiment of the present invention, both as separate invention embodiment or as part of the overall synthesis of a compound of the formula (III) and/or the synthesis of a compound of the formula (I), relates to a new method of manufacture (synthesis) of the intermediate of the formula (III)

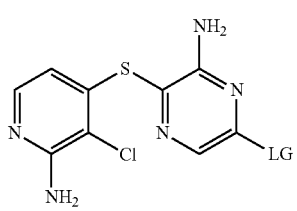

wherein LG is a leaving group, comprising reacting a compound of the formula (XV),

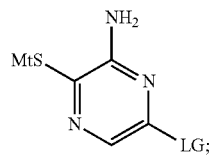

wherein LG is a leaving group and Mt is (then especially with regard to charge relatively half an atom of metal per sulfur) is an earth alkaline metal or (preferably) (then especially in the ratio of one Mt to one S) an alkaline metal atom, with a compound of the formula (XVI), $$\text{(XVI)}$$

to yield the compound of the formula (III), where the reaction takes place under transition metal free reaction conditions.

DESCRIPTION OF PREFERRED EMBODIMENTS

The following definitions define more general features in a preferred more specific way, and it is possible to replace one, more than one or all of the more general features in the invention variants=embodiments by a more specific definition, which defines more specific invention embodiments.

The conditions for the reactions described above are especially chosen as follows:

The reaction of a compound II with a compound of the formula III, wherein LG is a leaving group, preferably halo, especially bromo or more especially chloro, preferably takes place in the presence of a weak base, such as an alkali metal carbonate or metal-hydrogencarbonate, in a mixed solvent composed of aprotic solvent, such as an N,N-Dialkylamide of an alkanoic acid, for example dimethal acetamide or dimethyl formamide, and water, or in a mixed solvent composed of aprotic solvent such as sulfolane, and alcoholic solvent such as isopropanol, and water, at preferably elevated temperatures, for example in the range from 30° C. to the boiling point of the reaction mixtures, for example from 50 to 100° C.

The deprotecting (i) of a compound of the formula IV wherein $R_1$ is a secondary amino protecting group and $R_2$ is a protected amino group and $R_3$ is hydrogen to yield a compound of the formula II preferably takes place in the presence of a strong acid $H_nA$, such as trifluoroacetic acid, trifluoromethane sulfonic acid or preferably an inorganic acid, for example sulfuric acid, phosphoric acid or especially a hydrogen halide, most especially hydrogen chloride, in a solvent, for example an alcohol, such as ethanol or especially methanol, or a mixture of alcohols (especially if $R_2$ is a benzyloxycarbonyl or especially alkoxycarbonyl, such as tert-butoxycarbonyl), or in an ester solvent such as isopropyl acetate (IPAc) or in the presence of water (especially if $R_2$ is an acyl, especially lower alkanoyl, for example acetyl) at preferred temperatures in the range from 10° C. to the boiling temperature of the solvent, for example from 20° C. to (especially where $R_2$ is acyl) 115° C.

The alternative reducing (ii) of a compound of the formula IV wherein $R_1$ is a secondary amino protecting group, $R_2$ is amino and $R_3$ is hydroxyl preferably takes place with a trialkylsilane, especially triethylsilane, in the presence of a strong inorganic or preferably (strong) organic acid, especially trifluoromethane sulfonic acid, in an appropriate aprotic solvent, such as an ether or especially acetonitrile, and subsequent addition of the acid $H_nA$ to yield the (salt or cocrystal) compound of formula II.

The reaction of the compound of the formula V with L-Lactide to yield a compound of the formula VI preferably takes place in the presence of a strong base, especially an alkyl-alkaline metals, such as n-butyllithium, and a nitrogen base, especially di-isopropylamine or diethylamine, in a solvent, such as an acyclic or especially cyclic ether, especially tetrahydrofuran or preferably 2-methyltetrahydrofuran, at preferably low temperatures, for example in the range from –80 to –5° C. If the reaction is conducted nearer to –80 to –40° C., especially in the range from –60 to –50° C., and preferably if the amount of the compound of L-lactide (the L form of the lactide) corresponds to 30 to 70 mol percent, preferably 45 to 65 mol %, more preferably 50 to 60 mol %, in relation to the mol amount of the compound of formula V, that is, roughly about half of the molar amount of the compound of formula V, the result is a compound of the formula VI. Mol % refers to mole percent.

The cyclization of a compound of the formula VI with hydroxylamine, or a salt thereof, to the compound of the formula VII preferably takes place with an acid addition salt of hydroxylamine, for example a hydrogen halide salt thereof, such as the hydrochloride salt thereof, in the presence of a weak base, for example an alkali metal alkanoate, such as sodium acetate, in solvent, for example an acyclic or especially cyclic ether, especially tetrahydrofuran or preferably 2-methyltetrahydrofuran, at preferred temperatures in the range from 0 to 80° C., for example from 10 to 50° C.

The hydrogenation (a-i) of the hydroxylamine compound of the formula VII to the corresponding amine of the formula VIII preferably takes place as heterogeneous hydrogenation in the presence of a hydrogenation catalyst, for example platinum, palladium, rhodium, or ruthenium or other highly active catalysts, which operate at lower temperatures (for example from 0 to 40° C.) and lower pressures (for example, 1 bar) of $H_2$, or non-precious metal catalysts, especially those based on nickel (such as Raney nickel and Urushibara nickel) at elevated temperatures and higher $H_2$ pressure, for example in the range from 5 to 50 bar, such as from 10 to 20 bar. The reaction is conducted in a polar solvent, especially an alcohol, for example an alkanol, such as ethanol or especially methanol.

The acylation (a-ii) of the hydroxyl compound of the formula VII under reducing conditions to the compound of the formula VIII* preferably takes place in the presence of an acylating agent, especially an anhydride of a carboxylic acid, such as an alkanoic acid anhydride, especially acetanhydride, in the presence of an ignoble metal, such as zinc (for example as zinc amalgam) or especially iron, and an acid, either an inorganic acid, such as a hydrogen halogenide, for example hydrogen chloride, sulfuric acid or an organic acid, such as the carboxylic acid corresponding to the anhydride, especially an alkanoic acid, especially acetic acid, as reductant, in an inert organic solvent, such as a hydrocarbon or an aromatic compound, for example toluene or xylylene, at preferably elevated temperatures in the range from 25° C. to the boiling point of the reaction mixture, for example in the range from 40 to 80° C.

Acyl, in the context of the present invention, refers to a moiety of an organic acid where in the acyl rest itself the carboxyl (—COOH) group is bound to a carbon (for example as in acetyl=$H_3CCOO$—), not (as for example in tert-butoxycarbonyl) to an oxygen.

The reduction (b-i) of a compound of the formula VIII to a compound of the formula IX preferably takes place with a complex hydride reducing the oxo in formula VIII to the hydroxy in formula IX, such as diisobutylaluminium hydride, in an aprotic solvent, such as an ether or especially a cyclic ether, such as tetrahydrofurane, at preferably low temperatures in the range from –100 to –20° C., for example from –80 to –70° C.

In the case where then the compound of the formula IX, as compound corresponding to the respective compound of the formula IV, is reduced to the compound of the formula II, the reduction preferably takes place with a trialkylsilane, especially triethylsilane, in an acid, especially a strong organic sulfonic acid, such as trifluoromethane sulfonic acid, in an aprotic solvent, such as a hydrocarbon, an ester or especially a nitrile, such as acetonitrile, at preferably elevated temperatures in the range from 30° C. to the boiling point of the reaction mixture, for example from 50 to 95° C. The subsequent reaction with the acid $H_nA$ preferably takes place in a protic, potentially aqueous solvent, such as isopropyl alcohol.

The reaction (c-i) of a compound of the formula VIII with an amino group inserting agent, especially a dialkanoyldicarbonate, especially di-tert-butyldicarbonate (=Boc anhydride) is preferably conducted in the presence of an tertiary amine, such as a tri-alkyl-amine, especially diisopropylethylamine, or in the presence of a weak inorganic base, such as an alkali metal carbonate or metal-hydrogencarbonate, in an aprotic solvent, especially a halogenated hydrocarbon, such as dichloromethane, or in an ether or especially a cyclic ether, such as tetrahydrofurane at preferred temperatures in the range from 0 to 50° C., for example from 20 to 30° C., resulting in a compound of the formula X.

The reducing of a compound of the formula X to a compound of the formula XI preferably takes place in the presence of a complex hydride capable of reducing the lactone group in formula X to the open ring in formula XI with two hydroxy groups, such as lithium borohydride and/or sodium borohydride, in an aprotic solvent, such as a linear or preferably a cyclic ether, for example tetrahydrofurane or 2-methyl tetrahydrofurane, preferably at a temperature in the range from 0 to 50° C., for example at 20 to 40° C.

The reaction of a compound of the formula XI, leading to introduction of a leaving group of the formula LG2, with a leaving group forming agent LG*-X in which X is halogen, especially chloro, LG* is an electrophilic radical capable, with the hydroxy to which it is bound, of forming a leaving group LG2, especially a sulfonylhalogenide, preferably toluolsolfonylchloride or more preferably 2,4,6-triisopropylbenzenesulfonyl chloride, to yield a compound of the formula XII preferably takes place in the presence of a base, such as an alkali metal hydroxide, for example sodium hydroxide, in an aqueous organic solvent, such as an aqueous halogenated hydrocarbon, for example dichloromethane, or in an ether or especially a cyclic ether, such as tetrahydrofurane, at preferred temperatures in the range from –10 to 50° C., for example from –5 to 30° C.

The cyclization of a compound of the formula XII to a compound of the formula XIII under basic conditions in the presence or absence of a phase transfer catalyst, for example a tetraalkylammonium halogenide, such as tetra-n-butylammoniumbromide, in the presence of a base, especially an alkali metal hydroxide, such as sodium hydroxide, in an aqueous organic solvent, such as an aqueous halogenated hydrocarbon, for example dichloromethane, or in an ether or especially a cyclic ether, such as tetrahydrofurane at preferred temperatures in the range from 0 to 50° C., for example from 20 to 30° C.

The deprotection of a compound of the formula XIII preferably takes place with the acid $H_nA$ which is part of the salt of the resulting formula II in a polar solvent, such as an alcohol, for example an alkanol, such as ethanol or especially methanol, or in a ester solvent such as isopropyl acetate (IPAc), at preferred temperatures in the range from 0 to 50° C., for example at 20 to 30° C.

The hydrogenation of a compound of the formula VIII* to a compound of the formula X* in the presence of a chiral hydrogenation catalyst (usually formed from a precatalyst, for example on Ruthenium(I) basis, such as Bis(norbornadiene)rhodium(I)tetrafluoroborate and a chiral ligand), for example as defined below, preferably takes place with hydrogen under elevated pressure, for example in the range of from 3 to 50 bar, such as 20 to 40 bar, in a polar solvent, especially and 2,2,2-trifluoroethanol, at temperatures preferably ranging from 30 to 80° C., for example from 40 to 60° C. This hydrogenation more generally takes place with hydrogen in the presence of a transition metal catalyst, preferably in the presence of a transition metal catalyst comprising an organometallic complex and a chiral ligand. The reduction may occur under hetero- or homogeneous hydrogenation conditions, preferably under homogeneous hydrogenation conditions. The transition metal is selected from group 9 or 10 of the periodic table. Therefore, the transition metal catalyst comprises, for example, Cobalt (Co), Rhodium (Rh), Iridium (Ir), Nickel (Ni), Palladium (Pd) and/or Platinum (Pt).

Among the chiral catalysts, all those allowing the hydrogenation of the double bond in the compound of formula VIII* to yield the configuration at the former double bond shown in formula X* are appropriate. It is further preferred that the chiral ligand comprises a chiral ferrocene.

A preferred chiral ferrocene has the formula:

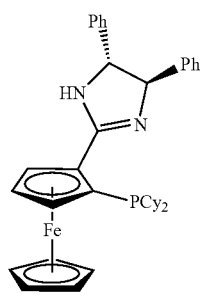

but others are possible as well, for example selected from the group comprising any one of the following formulae:

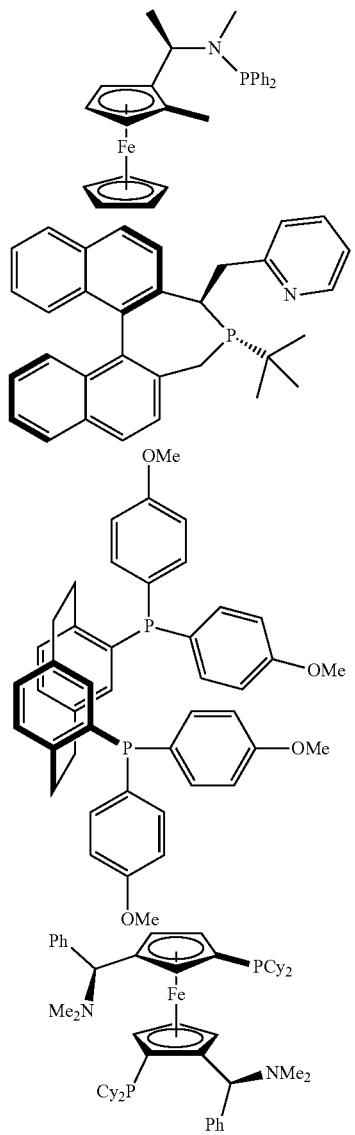

Mixtures of two or more such ligands, especially those defined by the formulae above, are also possible.

Usually, the active catalyst is formed by mixing 0.9 to 1.2, preferably 1.0 to 1.1, more preferably 1.0 to 1.05 mole of chiral ligand with 1.0 mole of transition metal atoms comprised in the transition metal catalyst. For example, if a dimer transition metal catalyst is employed, preferably two moles of chiral ligand are reacted with one mole of transition metal catalyst in order to form the "active catalyst".

The chiral ligand is typically added to the reaction mixture in a solution prepared with the same solvent used for the reaction.

The reduction of a compound of the formula X* to a compound of the formula XI* under ring opening preferably takes place in the presence of a complex hydride capable of reducing the lactone group in formula X to the open ring in formula XI with two hydroxy groups, such as lithium borohydride, in an aprotic solvent, such as a linear or preferably a cyclic ether, for example tetrahydrofurane, preferably at a temperature in the range from 0 to 50° C., for example at 20 to 30° C.

Amino protecting groups are preferably groups that can be cleaved by not too harsh acidic conditions, for example in the presence of a hydrogen halogenide, such as HCl, or in the case where a compound of formula II is the direct reaction product, an acid of the formula $H_nA$ as defined for a compound of the formula II, especially wherein n is 1 and A is a halogenide anion, especially a chloride anion. For example, each of 9-fluorenylmethoxycarbonyl, allyloxycarbonyl or especially tert-butoxycarbonyl is to be mentioned; however, also acyl groups, especially alkanoyl groups, e.g. with 2 to 10 carbon atoms, such as acetyl, are also appropriate amino protecting groups.

The reaction of a compound of formula XI*, leading to introduction of a leaving group of the formula LG2, with a leaving group forming agent LG*-X in which X is halogen, especially chloro, LG* is an electrophilic radical capable, with the hydroxy to which it is (to be) bound, of forming a leaving group LG2, especially a sulfonylhalogenide, preferably toluolsolfonylchloride, to yield a compound of the formula XII* preferably takes place in the presence of a base, such as an alkali metal hydroxide, for example sodium hydroxide, in an aqueous organic solvent, such as an aqueous halogenated hydrocarbon, for example dichloromethane, at preferred temperatures in the range from 0 to 50° C., for example from 20 to 30° C.

The cyclization of a compound of formula XII* to a compound of the formula XIII* preferably takes place under basic conditions in the presence of a phase transfer catalyst, for example a tetraalkylammonium halogenide, such as tetra-n-butylammoniumbromide, in the presence of a base, especially an alkali metal hydroxide, such as sodium hydroxide, in an aqueous organic solvent, such as an aqueous halogenated hydrocarbon, for example dichloromethane, at preferred temperatures in the range from 0 to 50° C., for example from 20 to 30° C.

The deprotection of a compound of the formula XIII* preferably takes place with the acid $H_nA$ which is part of the salt of the resulting formula II in a polar solvent, such as an alcohol, for example an alkanol, such as ethanol or especially methanol, at preferably elevated temperatures in the range from 50 to 120° C., for example at 100 to 115° C.

The compound of the formula III can be obtained as described in WO 2020/065452 A1. Preferably, however, it can be prepared as follows:

The compound of the formula III, in a further single invention embodiment or as part of the total synthesis of a compound of the formula I according to invention with steps mentioned above and below, is according to one embodiment preferably obtained by reacting a compound of the formula XIV:

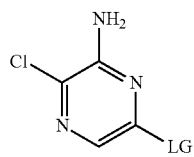

(XIV)

(which can be obtained from the corresponding trichloro compound, 2,3-5-thrichloropyrazine (instead of the $NH_2$ and the LG, chloro is present in the precursor of compound XIV, respectively), with ammonia as described in WO 2020/065452 A1), wherein LG is a leaving group as defined for a compound of the formula III, especially halo, more preferably iodo, bromo or in particular chloro, with a metal thiosulfate salt (which may be a hydrate or not), especially an alkaline metal or earth alkaline metal thiosulfate salt, more preferably an alkaline metal thiosulfate, most preferably with sodium thiosulfate, in the presence of an acid in an appropriate solvent, followed by treatment with an aqueous base, to yield a compound of the formula XV:

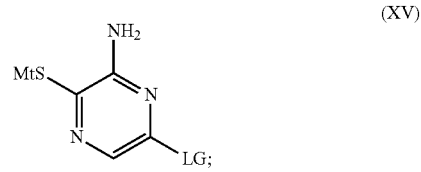

(XV)

wherein Mt is (then with regard to charge relatively half an atom of metal per sulfur) an earth alkaline metal or preferably (then in the ratio of one Mt to the one S) an alkaline metal atom, especially a sodium atom, and LG is a leaving group as just defined.

This reaction preferably takes place in an appropriate solvent, such as an aqueous alcohol, for example methanol or ethanol in mixture with water, in the presence of an acid, such as an inorganic acid, for example phosphoric acid and/or sodium dihydrogen phosphate, or preferably an organic acid, such as a sulfonic acid or more preferably of a strong carboxylic acid, e.g. a trihaloacetic acid, such as trifluoroacetic acid, or especially a carboxylic acid carrying more than one carboxyl (—COOH) group, e.g. two to three such groups, most especially citric acid (which generates less waste than phosphate buffer 85% $H_3PO_4/NaH_2PO_4$), at temperatures in the range from 20° C. to the boiling temperature of the reaction mixture, preferably at a temperature in the range from 20 to 100° C., most preferably in the range form 50 to 90° C., e.g. at about 85° C.

The compound of the formula XV is then, in a further preferred invention embodiment after manufacture of the compound of the formula XV as just described, in a yet further preferred embodiment of the invention as part of the total synthesis of the compound of the formula I, reacted with a compound of the formula XVI:

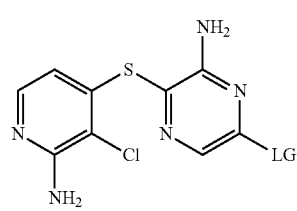

(XVI)

to yield the compound of the formula III:

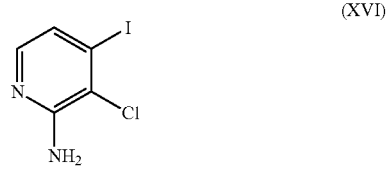

III wherein LG is a leaving group, especially as defined above for a compound of the formula III, most especially chloro.

The reaction preferably takes place in the presence of a noble metal complex, especially formed from $Pd_2(dbba)_2$, in the presence of a ligand, such as Xantphos, and of a tertiary nitrogen base, such as diisopropylamine, in an aprotic solvent, such as an ether, for example a cyclic ether, especially dioxane, at preferably elevated temperatures, for example in the range from 30° C. to the boiling point of the reaction mixture. Alternatively, the reaction can be conducted under Ullmann type reaction conditions e.g. with copper salt such as copper(I)iodide and diamine ligand such as phenanthroline ligand as complex former in an appropriate solvent or solvent mixture, e.g. in an aqueous alcohol, such as aqueous methanol, ethanol, propanol or especially isopropanol, at preferred temperatures in the range from 25 to 100° C., e.g. at 50 to 75° C.

In the case of the new invention embodiment of the manufacture of a compound of the formula (III) from a compound of the formula XV under transition metal free reaction conditions, that is, especially in the absence of a catalyst comprising or being an organometal catalyst, particularly in the absence of a catalytic copper salt or a catalytic noble metal complex or the reaction preferably takes place in an appropriate solvent or solvent mixture, e.g. in an aqueous alcohol, such as aqueous methanol, ethanol, propanol or especially isopropanol, in the presence of an acid, such as an inorganic acid, for example phosphoric acid and/or sodium dihydrogen phosphate, or preferably an organic acid, such as an acetic acid or more preferably of a strong carboxylic acid, e.g. a trihaloacetic acid, such as trifluoroacetic acid, or especially a carboxylic acid carrying more than one carboxyl (—COOH) group, e.g. two to three such groups, most especially citric acid (which has the additional advantage of generating less waste than phosphate buffer 85% $H_3PO_4/NaH_2PO_4$), at temperatures in the range from 20° C. to the boiling temperature of the reaction mixture, preferably at a temperature in the range from 20 to 100° C., most preferably in the range form 60 to 80° C.

Among the advantages of this synthesis variant (which corresponds to a further variant for the manufacture of a compound (III) by variants (i), (ii) or (iii) as described above and thus is also called variant (iv) herein for the manufacture of the compound (III) herein, especially in the form of intermediate Y7a=Y10a=Z17a, there is, in contrast to variant (i) mentioned above, no requirement of copper catalyst removal (e.g. with charcoal), especially by oxidation of the copper by bubbling through oxygen, which may bring a safety issue, and it does not require the use of the potentially mutagenic phenanthroline ligand; while in comparison to variants (ii) and (iii) above there is no need of an expensive Pd catalyst, therefore, the present variant is highly advantageous especially in larger scale synthesis, e.g. in the more than 1 kg scale.

Preferably, this variant (iv) is characterized by the following reaction scheme:

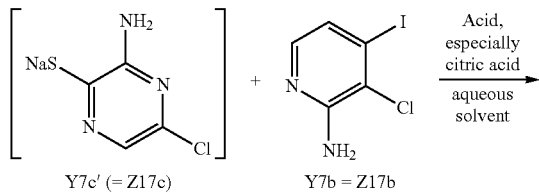

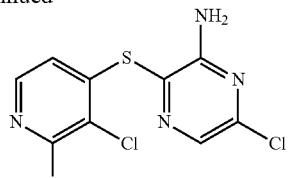

Y7a = Y10a = Z17a wherein Y7c'=Z17c corresponds to a compound of the formula (XV) and Y7b=Z17b corresponds to a compound of the formula (XVI). A specific variation of this embodiment is mentioned in the Examples.

In a preferred embodiment of the invention, the new reaction is part of the overall manufacture of a compound of the formula (III) with the preceding reaction steps as described herein, especially part of the overall manufacture of the compound of the formula (I) including this particular variant of the manufacture of a compound of the formula (III) as described herein.

The compound of formula XVI can preferably be obtained by reacting a compound of the formula XVII:

(XVII)

with iodine in the presence of a strong base.

This reaction preferably takes place in the presence of a strong base, especially an alkyl-alkaline metal, such as n-butyllithium, and a nitrogen base, especially di-isopropylamine or diethylamine, in a solvent, such as an acyclic or especially cyclic ether, preferably tetrahydrofurane, at preferably low temperatures, for example in the range from −80 to −5° C.

This results in a compound of the formula XVIII:

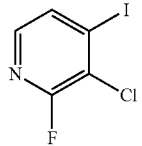

(XVIII)

which is then treated with ammonia to yield the compound of the formula XVI.

This reaction then preferably takes place in the presence of free ammonia and an inert polar solvent, such as DMSO, especially at elevated temperatures, preferably in the range from 30° C. to the boiling point of the reaction mixture, for example at 85 to 95° C.

Another embodiment of the invention comprises the manufacture of a compound of the formula II and a compound of the formula III as described above, namely a method for the manufacture of a compound of Formula I, or a pharmaceutically acceptable salt, acid co-crystal, hydrate or other solvate thereof, said method comprising reacting a compound of formula II with a compound of formula III according to the following reaction scheme:

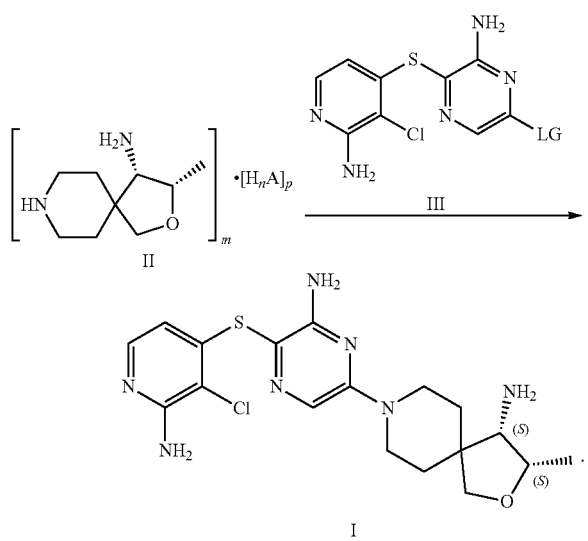

wherein LG is a leaving group, A is the anion of a protic acid, and n, m and p are independently 1, 2 or 3, so that the salt of the formula II is electrically neutral.

Where compounds are being referred to above during process descriptions or as such, the mentioning of the compound also includes salts, hydrates or solvates thereof, where such forms are not excluded e.g. due to lack of groups that might form salts.

Unsubstituted (preferred) or substituted alkyl where mentioned is especially $C_1$-$C_{20}$-alkyl, preferably $C_1$-$C_8$-alkyl, and may be linear or branched; preferred are methyl, ethyl, propyl, isopropyl, n-butyl, sec.-butyl or tert-butyl.

Unsubstituted (preferred) or substituted cycloalkyl especially refers to a saturated ring having 3 to 20 ring carbon atoms, especially to $C_3$-$C_8$-cycloalkyl, such as cyclopentyl, cyclohexyl of cycloheptyl.

Unsubstituted or substituted aryl especially refers to $C_6$-$C_{22}$-aryl, especially phenyl, naphthyl or fluorenyl.

Where substituted is mentioned, this preferably refers to substitution with one or more substituents the skilled person knows not to interfere with any of the described reaction, especially moieties selected from $C_1$-$C_8$-alkoxy, $C_1$-$C_8$-alkanoyloxy, hydroxyl, carboxy, $C_1$-$C_8$-alkoxycarbonyl, or (especially in the case of substituted alkyl) phenyl, naphthyl or fluorenyloxymethyl.

EXAMPLES

The following examples serve to illustrate the invention without limiting the scope otherwise defined herein; they are, however, preferred invention embodiments as well. Abbreviations used: Ac (acetate); AcOH (acetic acid); Ac$_2$O (aceticanhydride); aq (aqueous); Boc (tert-butoxycarbonyl); Boc$_2$O (Di-tert-butyl dicarbonate); Brine (sodium chloride solution saturated at RT); n-Bu$_4$NBr (Tetra-(n-butyl)ammonium bromide); n-BuLi (n-Butyllithium); calcd (calculated); DCM (dichloromethane); DIBAL-H (Diisobutylaluminiumhydride); DIPEA (Di(isopropyl)ethylamine); DMAc (dimethyl acetamide); DMSO (dimethyl sulfoxide); DMSO-d$_6$ (perdeuterated dimethyl sulfoxide); eq or equiv. (equivalents); Et (Ethyl); EtOAc (ethyl acetate); EtOH (ethanol); HRMS (High Resolution Mass Spectroscopy); hrs. (Hour(s)); IPA (Isopropyl alcohol); IPAc (isopropyl acetate); IT (Internal Temperature (of a reaction mixture)); L (liter(s)); LDA (lithium diisopropyl amide); LOQ (Limit of Quantification); MCC (Microcrystalline Cellulose); Me (Methyl); MeOH (Methanol); 2-MeTHF (2-methyl tetrahydrofurane; MTBE (methyl tertiary-butyl ether); NMR (Nuclear Magnetic Resonance); PA (Polyamide); $^i$PrOH (Isopropanpol); $^i$Pr$_2$NH (diisopropyl amine); qNMR (quantitative NMR); rt, Rt or RT (Room Temperature (about 20 to 25° C.)); TBAB (Tetra-(n-butyl)ammoniumbromide); TfOH (triflic acid); THF (Tetrahydrofurane); TsCl (Tosylchloride); TPSCl (2,4,6-triisopropylbenzenesulfonyl chloride); Triflic acid (Trifluoromethane sulfonic acid); wt % (weight percent) and Xantphos (4,5-Bis(diphenylphosphino)-9,9-dimethylxanthene).

Example 1

Route ALFA

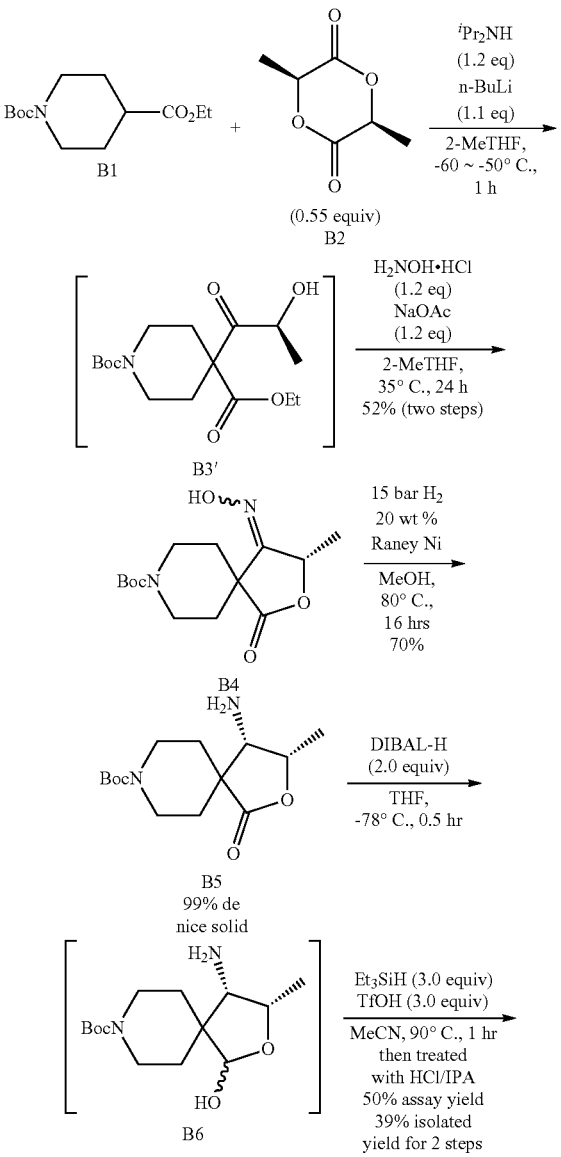

-continued

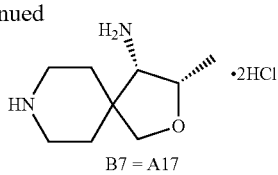

B7 = A17

In detail, the synthesis steps are as follows:
Step a (Also a Preferred Invention Embodiment on its Own):

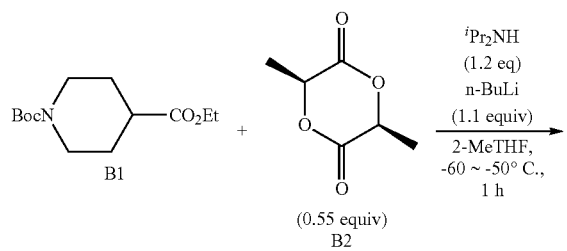

A 630 L reactor with an impeller stirrer was charged with diisopropylamine (17.0 kg, 168 mol, 1.2 equiv.) and 2-methyltetrahydrofuran (185 kg) under a nitrogen atmosphere. The mixture was stirred (mid to high speed) and cooled to IT=0±5° C. A solution of n-BuLi (2.5 M in hexanes solution, 41.6 kg, 154 mol, 1.1 equiv.) was added at IT=0±5° C. The freshly prepared LDA in 2-methyltetrahydrofuran was then cooled to IT=−60±10° C. A solution of B1 (36.0 kg, 140 mol, 1.0 equiv) in 2-methyltetrahydrofuran (31 kg) was added at IT=−60±10° C. The resulting yellow solution was stirred at IT=−60±10° C. for 0.5 hours. Then a solution of B2 (11.1 kg, 77 mol, 0.55 equiv.) in 2-methyltetrahydrofuran (91.8 kg) was added dropwise at IT=−60±10° C. The mixture was stirred at IT=−60±10° C. for an additional 1.0 hour. A solution of acetic acid (21.9 kg, 365 mol, 2.6 equiv.) in 2-methyltetrahydrofuran (10 kg) was added at IT=−60±10° C. (note: highly exothermic). The resulting suspension was allowed to warm to IT=0±5° C., then a solution of 0.5% hydrochloric acid (145 kg) was added to the reactor. The biphasic mixture was warmed to IT=25±5° C. The reaction mixture was transferred to an extraction vessel, the bottom aqueous layer was disposed. 10 wt % aq. NaCl (72 kg) was added, and the biphasic mixture was stirred for 0.5 hours. The bottom aqueous layer was disposed. The top organic phase was collected and stored under nitrogen at 25±5° C. as a solution of B3' in 2-methyltetrahydrofuran (416 kg). HRMS m/z calcd for $C_{16}H_{28}NO_6$ [M+H]$^+$ 330.1911, found 330.2708.

Step b (Also a Preferred Invention Embodiment on its Own):

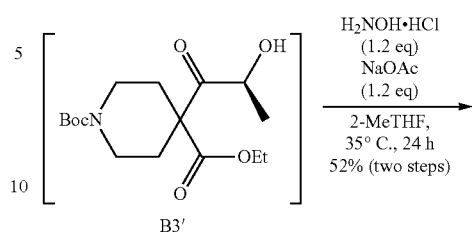

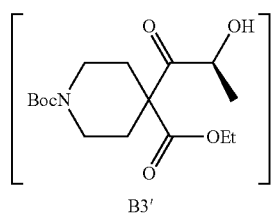

B4

A 1000 L reactor with an impeller stirrer was charged with B3' in 2-methyltetrahydrofuran (407 kg). 2-Methyltetrahydrofuran (246 kg) was added, and the resulting mixture was distilled under vacuum at IT≤50° C. until 324 kg of distillate was collected. Additional 2-methyltetrahydrofuran (154 kg) was added, and the resulting mixture was distilled under vacuum at IT≤50° C. until 154 kg of distillate was collected. Water content in the residue was tested to be <3000 ppm. Hydroxylamine hydrochloride (11.7 kg, 168 mol, 1.2 equiv.) and sodium acetate (13.8 kg, 168 mol, 1.2 equiv.) was then added. The resulting suspension was stirred (high speed) at IT=35±5° C. for 18 hours. The suspension was cooled to IT=25±5° C. Water (144 kg) was then added, and the mixture was stirred for 0.5 hour. The bottom aqueous phase was disposed. 7 wt % aq. NaCl (108 kg) was added, and the biphasic mixture was stirred for 0.5 hour. The bottom aqueous phase was disposed. The top organic phase was collected and distilled under vacuum at IT≤60° C. until 216 kg of distillate was collected. Toluene (316 kg) was added, and the suspension was distilled under vacuum at IT≤60° C. until 307 kg of distillate was collected. The resulting suspension was heated to IT=80±5° C. with stirring (stirring speed=56 rpm). n-Heptane (297 kg) was added slowly (stirring speed=90 rpm) over 2 hours. The resulting suspension was cooled to 25±5° C. over 4 hours. and filtered with a Nutsche filter (20 μM, PA). The filter cake was rinsed with n-heptane (62 kg), collected and dried under vacuum. B4 was obtained as a white solid, 22.68 kg (ee=93.74%, assay by qNMR=101.74%, yield=52.6% over two steps). $^1$H NMR (400 MHz, DMSO-d$_6$) δ=11.45 (s, 1H), 5.33 (q, J=6.6 Hz, 1H), 3.73-3.58 (m, 2H), 3.56-3.43 (m, 1H), 3.43-3.35 (m, 1H), 1.87-1.65 (m, 4H), 1.52 (d, J=6.7 Hz, 3H), 1.41 (s, 9H).

Step a and step b together in their sequential arrangement also represent a preferred invention embodiment.

Step c:

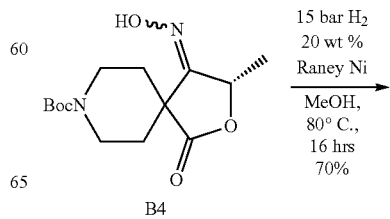

B4

-continued

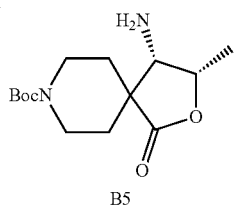

B5

To a 1 L reactor with an impeller stirrer under an nitrogen atmosphere was added Raney-Ni (5 g) and MeOH (250 mL), followed by tert-butyl (S)-4-(hydroxyimino)-3-methyl-1-oxo-2-oxa-8-azaspiro[4.5]decane-8-carboxylate B4 (25.0 g, 83.80 mmol). The reactor was purged with nitrogen three times and then with hydrogen three times. The mixture was stirred for 16 hrs under a hydrogen pressure of 20 bar at IT=80° C. The reaction mixture was filtered through microcrystalline cellulose and the filter cake was washed with MeOH (10 ml). The filtrate was concentrated to dryness to give a white solid (23.0 g). EtOAc (220 mL) was added to the solid, the resulting suspension was heated to reflux (JT=100° C.) and n-heptane (550 mL) was added portionwise. The resulting clear solution was cooled to rt during 2 hrs and left standing overnight to give B5 as a colorless crystalline product (16.7 g, cis/trans>99/1, 70%). $^1$H NMR (400 MHz, CDCl$_3$) δ=4.75-4.64 (m, 1H), 3.89-3.80 (m, 1H), 3.68-3.58 (m, 1H), 3.48-3.33 (m, 3H), 1.92-1.61 (m, 4H), 1.46 (s, 9H), 1.40 (d, J=6.5 Hz, 3H).

Step d:

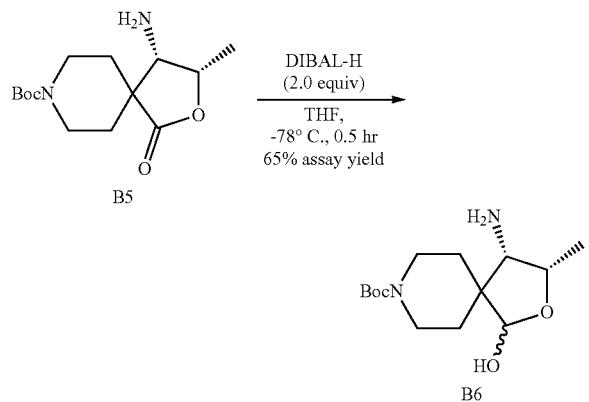

A 500 mL three-necked round bottomed flask under an nitrogen atmosphere was charged with tert-butyl (3S,4S)-4-amino-3-methyl-1-oxo-2-oxa-8-azaspiro[4.5]decane-8-carboxylate B5 (6.0 g, 21.1 mmol) and THF (200 mL). The solution was cooled to an IT=−78° C., 1.0 M DIBAL (42.2 mL, 42.2 mmol, 2.0 eq) was added dropwise during 30 min. The reaction was stirred at −78° C. for 30 min. A saturated aqueous Na,K-tartrate solution (150 mL) was added carefully to quench the reaction while maintaining the IT=−78° C. to −60° C. The mixture was stirred vigorously at 20-25° C. until two clear phases were obtained (ca. 1.5 hrs) and extracted with EtOAc (200 mL×2). The combined organic extracts were washed with 20 wt % brine (200 mL), dried over Na$_2$SO$_4$, filtered and concentrated to give B6 as a viscous oil (6.1 g, 64 wt %, 65% assay yield), which was used in the next step without further purification. $^1$H NMR (400 MHz, CDCl$_3$) δ=5.06 (s, 1H), 4.39-4.29 (m, 1H), 3.68-3.57 (m, 2H), 3.35-3.24 (m, 2H), 3.18 (d, J=4.4 Hz, 1H), 1.98-1.85 (m, 1H), 1.75-1.54 (m, 3H), 1.46 (s, 9H), 1.35 (d, J=6.6 Hz, 3H).

Step e:

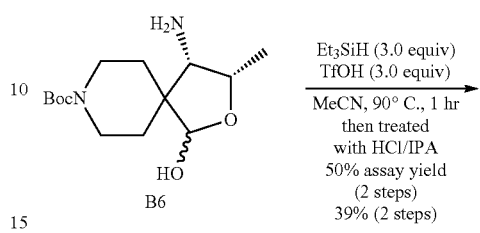

To a 100 mL round bottomed flask was added 6.0 g of the above viscous oil and acetonitrile (150 mL). The flask was cooled in an ice-water bath and triethylsilane (7.4 g, 63.3 mmol), triflic acid (9.5 g, 63.3 mmol) was added subsequently. The reaction was then stirred for 1 hr in a 90° C. oil bath. The reaction was then cooled to 20-25° C. and poured into a separation funnel and washed with n-heptane (100 mL×2). The acetonitrile layer was separated and concentrated to dryness to give a colorless oil, which was diluted in EtOAc (150 mL). 6N HCl in isopropanol (30 mL) was added dropwise with stirring, white solid precipitated out. MTBE (150 mL) was added and the white suspension was stirred for 2 hrs and filtered. The filter cake was washed with EtOAc (50 mL×2) to give a white solid, which was dissolved in MeOH (6.0 mL), EtOAc (18 mL) was added dropwise with stirring. The resulting white suspension was filtered and washed with EtOAc (10 mL×2) to give B7 as a white solid (2.5 g, 81 wt %, 39% over two steps).

$^1$H NMR (400 MHz, DMSO-d$_6$) δ=9.37 (br s, 1H), 9.25 (br s, 1H), 8.42 (br s, 3H), 4.26-4.17 (m, 1H), 3.72 (ABq, J=9.1 Hz, 2H), 3.50-3.41 (m, 1H), 3.28-3.18 (m, 1H), 3.18-3.09 (m, 1H), 2.99-2.74 (m, 2H), 2.07-1.63 (m, 4H), 1.22 (d, J=6.5 Hz, 3H).

Step f:

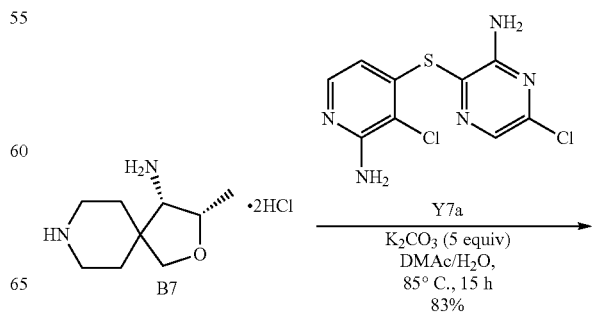

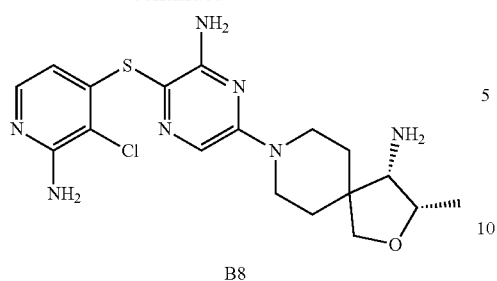

B8

To a 10 mL Schlenk tube was added 3-((2-amino-3-chloropyridin-4-yl)thio)-6-chloropyrazin-2-amine Y7a (0.1 g, 0.347 mmol), (3S,4S)-3-methyl-2-oxa-8-azaspiro[4.5]decan-4-amine dihydrochloride B7 (0.1 g, 0.416 mmol, 1.2 eq), DMAc (0.6 mL) and 36 wt % aq. $K_2CO_3$ (0.66 g, 1.735 mmol, 5.0 eq). The mixture was stirred for 16 hrs in a 100° C. oil bath and cooled to 20-25° C. 20 wt % Brine (10 mL) was added and the mixture was extracted with EtOAc (20 mL×2). The combined extracts were washed with 20 wt % Brine (10 mL×4), dried over anhydrous $Na_2SO_4$ and filtered. The filtrate was concentrated to dryness to give B8 as a yellow solid (121 mg, 83%). $^1$H NMR (400 MHz, DMSO-$d_6$) δ=7.64 (d, J=6.2 Hz, 1H), 7.62 (s, 1H), 6.26 (s, 2H), 6.13 (s, 2H), 5.74 (d, J=5.3 Hz, 1H), 4.12-4.02 (m, 1H), 3.90-3.78 (m, 2H), 3.67 (d, J=8.4 Hz, 1H), 3.49 (d, J=8.4 Hz, 1H), 3.33 (s, 2H), 2.91 (d, J=5.1 Hz, 1H), 1.78-1.68 (m, 1H), 1.67-1.57 (m, 1H), 1.56-1.41 (m, 2H), 1.08 (d, J=6.5 Hz, 3H).

Example 2

Route BETA

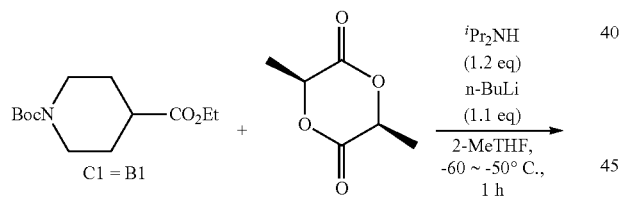

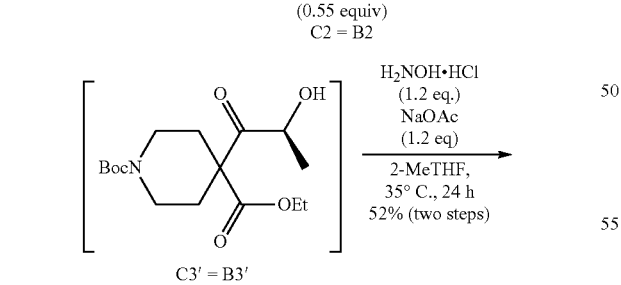

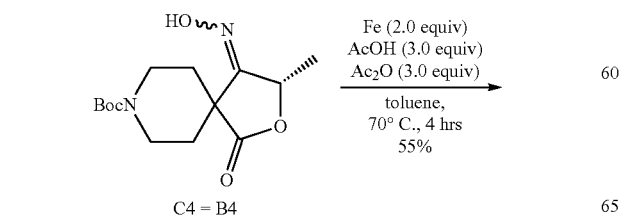

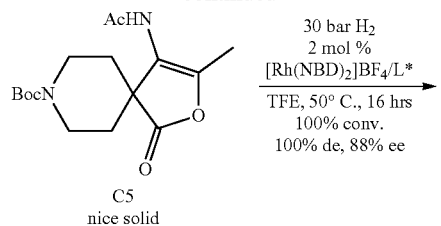

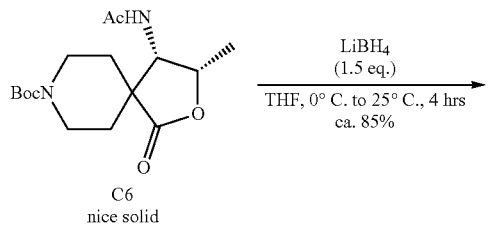

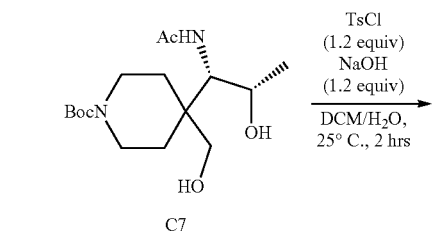

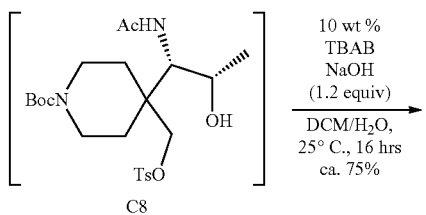

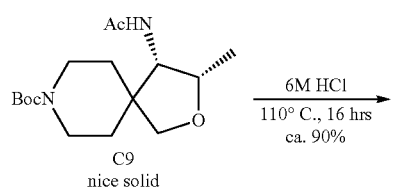

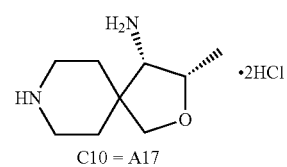

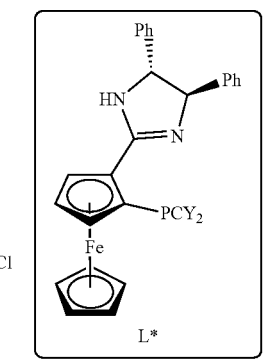

Step a and Step b:

These two steps correspond to steps a and b in Route ALFA (cf Example 1) and yield Compound C4=B4.

Step c:

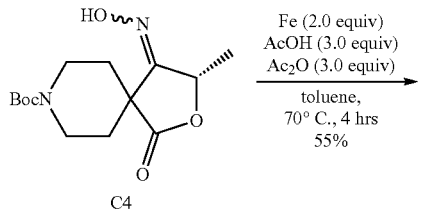

To a 500 mL round bottomed flask under a nitrogen atmosphere was added subsequently tert-butyl-4-(hydroxyimino)-3-methyl-1-oxo-2-oxa-8-azaspiro[4.5]decane-8-carboxylate C4 (27.9 g, 93.5 mol), toluene (150 mL), acetic anhydride (29.1 g, 280.6 mmol), acetic acid (16.8 g, 280.6 mmol) and iron (10.4 g, 187.0 mmol). The mixture was stirred vigorously for 4 hrs in a 70° C. oil bath and cooled to rt. The suspension was filtered through microcrystalline cellulose to remove solid residue, which was then washed with EtOAc (150 mL×2). The combined filtrates were cooled in an ice-water bath and washed with 5 wt % NaHCO$_3$ (300 mL) and 20 wt % brine (300 mL). The organic layer was separated, dried over Na$_2$SO$_4$ and filtered. The filtrate was evaporated to dryness. The residue was purified by column chromatography (silica gel, EtOAc/n-heptane=1/1 to 3/1, v/v) and further purified by recrystallization from EtOAc/n-heptane to give C5 as white needle crystals (16.7 g, 55%). $^1$H NMR (400 MHz, CDCl$_3$) δ=7.43 (s, 1H), 4.10-3.78 (m, 2H), 3.55-3.38 (m, 2H), 2.10 (s, 3H), 1.94 (s, 3H), 1.76-1.58 (m, 4H), 1.45 (s, 9H).

Step d:

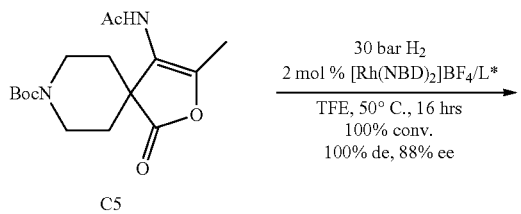

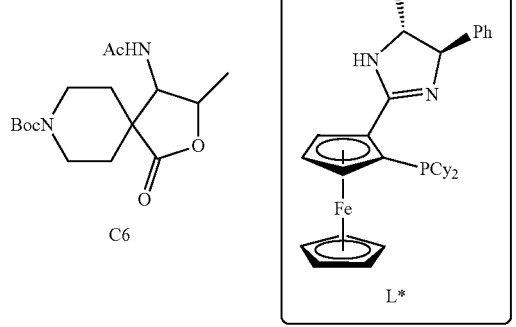

To a vial under a nitrogen atmosphere was added [Rh(NBD)$_2$]BF$_4$ (2.0 mg, 0.005 mmol), ligand L* (from Johnson Matthey & Brandenberger AG, Zurich, Schweiz) (3.3 mg, 0.005 mmol) and DCM (1 mL). The resulting solution was stirred for 30 minutes before solvent was removed to give a yellow solid. To the vial under a nitrogen atmosphere was added tert-butyl 4-acetamido-3-methyl-1-oxo-2-oxa-8-azaspiro[4.5]dec-3-ene-8-carboxylate C5 (86 mg, 0.27 mmol) and 2,2,2-trifluoroethanol (TFE) (2.7 mL). The vial was placed into a hydrogenation reactor. The reactor was purged with nitrogen three times and then with hydrogen three times. The mixture was stirred for 16 hrs under a hydrogen pressure of 30 bar at IT=50° C. The reaction was cooled to 20-25° C., filtered through a short silica pad and concentrated to dryness to give C6 as a white solid (86 mg, 100%). $^1$H NMR (400 MHz, DMSO-d$_6$) δ=8.33 (br d, J=10.3 Hz, 1H), 4.94-4.84 (m, 1H), 4.71-4.56 (m, 1H), 3.78-3.65 (m, 2H), 3.22-3.02 (m, 1H), 2.87-2.69 (m, 1H), 1.89 (s, 3H), 1.64-1.50 (m, 4H), 1.40 (s, 9H), 1.19 (d, J=6.7 Hz, 3H).

Step e:

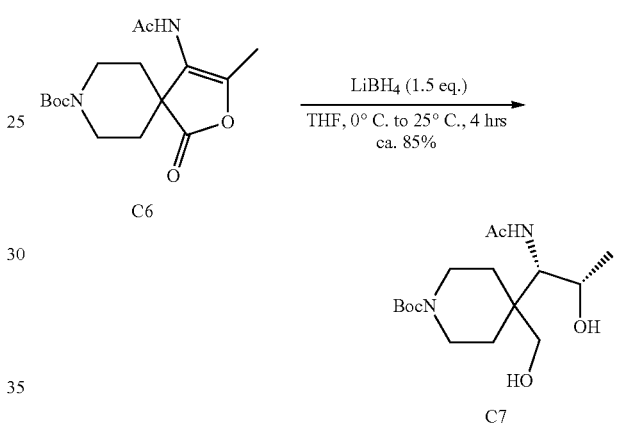

To a 10 mL Schlenk flask under a nitrogen atmosphere was added tert-butyl (3S,4S)-4-acetamido-3-methyl-1-oxo-2-oxa-8-azaspiro[4.5]decane-8-carboxylate C6 (300 mg, 0.919 mmol) and THF (3.0 mL). The flask was cooled in an ice-water bath. 2.0M LiBH$_4$ in THF (0.7 mL) was added dropwise and the reaction was stirred for 4 hrs at 20-25° C. The reaction was cooled in an ice-water bath and quenched by adding 5 wt % NaHCO$_3$ (1.0 mL) dropwise. The mixture was separated and the water layer was extracted by EtOAc (10 mL×3). The combined extracts were washed with 20 wt % brine (20 mL). The organic layer was separated, dried over Na$_2$SO$_4$ and filtered. The filtrate was evaporated to dryness. The residue was purified by column chromatography (silica gel, EtOAc/n-heptane=1/1 to 1/3, v/v) to give C7 as a colorless viscous oil (258 mg, 85%). $^1$H NMR (400 MHz, DMSO-d$_6$) δ=7.48 (br d, J=10.1 Hz, 1H), 5.23 (br s, 1H), 5.15 (br s, 1H), 4.09-4.04 (m, 1H), 3.92-3.82 (m, 1H), 3.75 (d, J=10.1 Hz, 1H), 3.56 (d, J=5.1 Hz, 1H), 3.54-3.44 (m, 4H), 1.98 (s, 3H), 1.68-1.57 (m, 2H), 1.52-1.46 (m, 2H), 1.44 (s, 9H), 1.00 (d, J=6.2 Hz, 3H).

Step f:

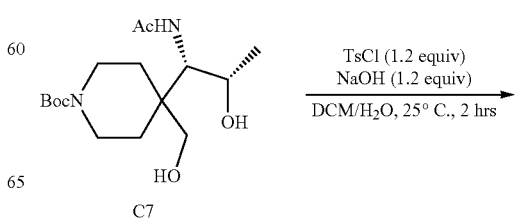

-continued

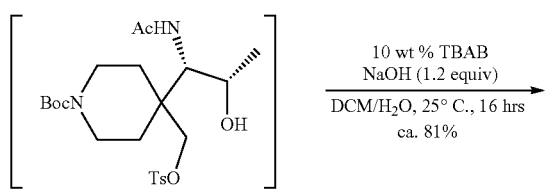

To a 25 mL Schlenk tube under a nitrogen atmosphere was added NaOH (94 mg, 2.35 mmol) and water (5.0 mL). The tube was cooled in an ice-water bath and a solution of tert-butyl 4-((1S,2S)-1-acetamido-2-hydroxypropyl)-4-(hydroxymethyl)piperidine-1-carboxylate C7 (650 mg, 1.97 mmol) and TsCl (450 mg, 2.36 mmol) in DCM (5.0 mL) was added dropwise. The mixture was then stirred for 16 hrs at 20-25° C. n-Bu₄NBr (65 mg, 0.202 mmol) was added followed by NaOH (94 mg, 2.35 mmol) in water (2.0 mL). The mixture was then stirred for 16 hrs at 20-25° C. The organic layer was separated, washed with 20 wt % brine (5 mL), dried over Na₂SO₄ and filtered. The filtrate was evaporated to dryness to give C9 as a white solid (500 mg, 81%). $^1$H NMR (400 MHz, DMSO-d₆) δ=7.82 (br d, J=10.0 Hz, 1H), 4.18-4.06 (m, 2H), 3.65-3.56 (m, 1H), 3.55 (ABq, J=8.7 Hz, 2H), 3.32-3.11 (m, 3H), 1.89 (s, 3H), 1.57-1.40 (m, 4H), 1.38 (s, 9H), 1.01 (d, J=6.1 Hz, 3H).

Step g:

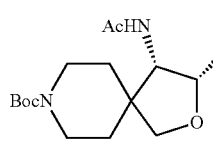

To a 10 mL sealed tube was added tert-butyl (3S,4S)-4-acetamido-3-methyl-2-oxa-8-azaspiro[4.5]decane-8-carboxylate C9 (25 mg, 0.077 mmol) and 6N aq. HCl (1.0 mL). The reaction was stirred for 16 hrs in a 110° C. oil bath. The reaction was then cooled to 20-25° C. and concentrated to dryness to give C10 as a white solid (17.0 mg, 90%). $^1$H NMR (400 MHz, DMSO-d₆) δ=9.37 (br s, 1H), 9.25 (br s, 1H), 8.42 (br s, 3H), 4.26-4.17 (m, 1H), 3.72 (ABq, J=9.1 Hz, 2H), 3.50-3.41 (m, 1H), 3.28-3.18 (m, 1H), 3.18-3.09 (m, 1H), 2.99-2.74 (m, 2H), 2.07-1.63 (m, 4H), 1.22 (d, J=6.5 Hz, 3H).

Step h:

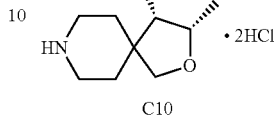

To a 10 mL Schlenk tube was added 3-((2-amino-3-chloropyridin-4-yl)thio)-6-chloropyrazin-2-amine Y10a (0.1 g, 0.347 mmol), (3S,4S)-3-methyl-2-oxa-8-azaspiro[4.5]decan-4-amine dihydrochloride C10 (0.1 g, 0.416 mmol, 1.2 eq), DMAc (0.6 mL) and 36 wt % aq. K₂CO₃ (0.66 g, 1.735 mmol, 5.0 eq). The mixture was stirred for 16 hrs in a 100° C. oil bath and cooled to 20-25° C. 20 wt % Brine (10 mL) was added and the mixture was extracted with EtOAc (20 mL×2). The combined extracts were washed with 20 wt % Brine (10 mL×4), dried over anhydrous Na₂SO₄ and filtered. The filtrate was concentrated to dryness to give C11 as a yellow solid (121 mg, 83%). $^1$H NMR (400 MHz, DMSO-d₆) δ=7.64 (d, J=6.2 Hz, 1H), 7.62 (s, 1H), 6.26 (s, 2H), 6.13 (s, 2H), 5.74 (d, J=5.3 Hz, 1H), 4.12-4.02 (m, 1H), 3.90-3.78 (m, 2H), 3.67 (d, J=8.4 Hz, 1H), 3.49 (d, J=8.4 Hz, 1H), 3.33 (s, 2H), 2.91 (d, J=5.1 Hz, 1H), 1.78-1.68 (m, 1H), 1.67-1.57 (m, 1H), 1.56-1.41 (m, 2H), 1.08 (d, J=6.5 Hz, 3H).

Example 3

Route GAMMA

-continued

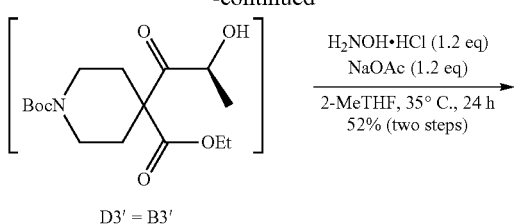

D3' = B3'

H2NOH·HCl (1.2 eq)
NaOAc (1.2 eq)
———————————→
2-MeTHF, 35° C., 24 h
52% (two steps)

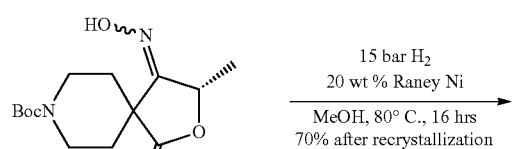

D4 = B4

15 bar H2
20 wt % Raney Ni
———————————→
MeOH, 80° C., 16 hrs
70% after recrystallization

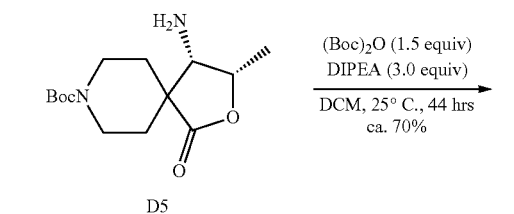

D5

70% de for crude product
99% de after one recrystallization
from n-heptane/EtOAc
nice solid (Boc)2O (1.5 equiv)
DIPEA (3.0 equiv)
———————————→
DCM, 25° C., 44 hrs
ca. 70%

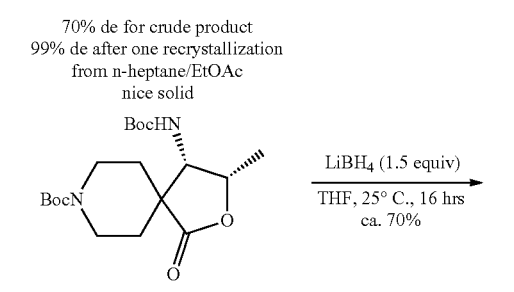

D6

LiBH4 (1.5 equiv)
———————————→
THF, 25° C., 16 hrs
ca. 70%

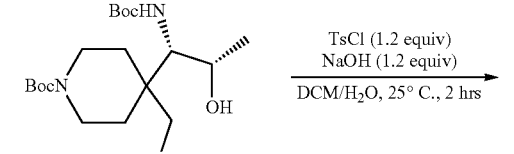

D7

TsCl (1.2 equiv)
NaOH (1.2 equiv)
———————————→
DCM/H2O, 25° C., 2 hrs

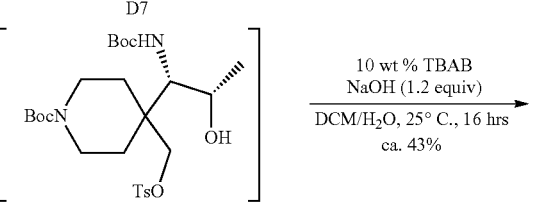

D8

10 wt % TBAB
NaOH (1.2 equiv)
———————————→
DCM/H2O, 25° C., 16 hrs
ca. 43%

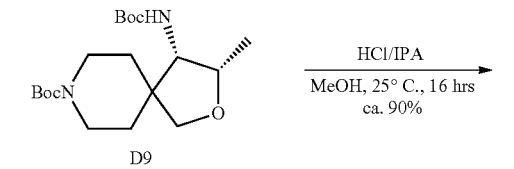

D9

HCl/IPA
———————————→
MeOH, 25° C., 16 hrs
ca. 90%

-continued

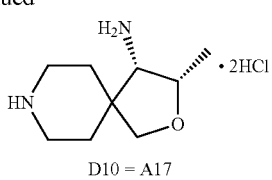

D10 = A17

Step a and Step b:

These two steps correspond to steps a and b in Route ALFA (cf. Example 1) and yield Compound D4=B4.

Step c:

15 bar H2
20 wt % Raney Ni
———————————→
MeOH, 80° C., 16 hrs
70%

D4

D5

To a 1 L reactor with an impeller stirrer under an nitrogen atmosphere was added Raney-Ni (5 g) and MeOH (250 mL), followed by tert-butyl (S)-4-(hydroxyimino)-3-methyl-1-oxo-2-oxa-8-azaspiro[4.5]decane-8-carboxylate D4 (25.0 g, 83.80 mmol). The reactor was purged with nitrogen three times and then with hydrogen three times. The mixture was stirred for 16 hrs under a hydrogen pressure of 20 bar at IT=80° C. The reaction mixture was filtered through microcrystalline cellulose and the filter cake was washed with MeOH (10 ml). The filtrate was concentrated to dryness to give a white solid (23.0 g). EtOAc (220 mL) was added to the solid, the resulting suspension was heated to reflux (IT=100° C.) and n-heptane (550 mL) was added portionwise. The resulting clear solution was cooled to rt during 2 hrs and left standing overnight to give D5 as colorless crystals (16.7 g, cis/trans>99/1, 70%). $^1$H NMR (400 MHz, CDCl$_3$) δ=4.75-4.64 (m, 1H), 3.89-3.80 (m, 1H), 3.68-3.58 (m, 1H), 3.48-3.33 (m, 3H), 1.92-1.61 (m, 4H), 1.46 (s, 9H), 1.40 (d, J=6.5 Hz, 3H).

Step d:

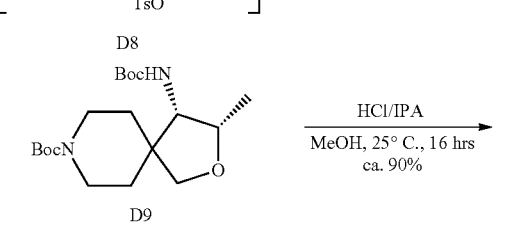

D5

(Boc)2O (1.5 equiv)
DIPEA (3.0 equiv)
———————————→
DCM, 25° C., 44 hrs
ca. 70%

-continued

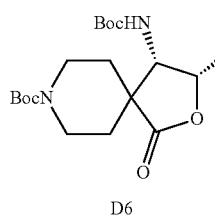

D6

To a 10 mL Schlenk tube was added tert-butyl (3S,4S)-4-amino-3-methyl-1-oxo-2-oxa-8-azaspiro[4.5]decane-8-carboxylate D5 (100 mg, 0.352 mmol) and DCM (5.0 mL). The tube was cooled in an ice-water bath. Diisopropylamine (182 mg, 1.41 mmol) was added dropwise followed by Boc$_2$O (230 mg, 1.05 mmol). The reaction was then stirred for 44 hrs at 20-25° C. The organic layer was separated, washed with 20 wt % brine (5 mL), dried over Na$_2$SO$_4$ and filtered. The filtrate was evaporated to dryness to give D6 as a colorless oil (95 mg, 70%), which gradually solidified upon standing. HRMS m/z calcd for $C_{19}H_{33}N_2O_6$ [M+H]$^+$ 385.2333, found 385.2334.

Step e:

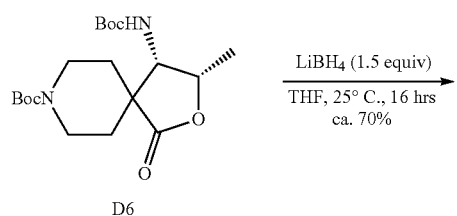

To a 10 mL Schlenk flask under a nitrogen atmosphere was added tert-butyl (3S,4S)-4-((tert-butoxycarbonyl)amino)-3-methyl-1-oxo-2-oxa-8-azaspiro[4.5]decane-8-carboxylate D6 (126 mg, 0.335 mmol) and THF (3.0 mL). The flask was cooled in an ice-water bath. 2.0M LiBH$_4$ in THF (0.25 mL) was added dropwise and the reaction was stirred for 16 hrs at 20-25° C. The reaction was cooled in an ice-water bath and quenched by adding 5 wt % NaHCO$_3$ (1.0 mL) dropwise. The mixture was separated and the water layer was extracted by EtOAc (10 mL×3). The combined extracts were washed with 20 wt % brine (20 mL). The organic layer was separated, dried over Na$_2$SO$_4$ and filtered. The filtrate was evaporated to dryness to give D7 as a colorless viscous oil (91 mg, 70%). HRMS m/z calcd for $C_{19}H_{37}N_2O_6$ [M+H]$^+$ 389.2646, found 389.2628.

Step f:

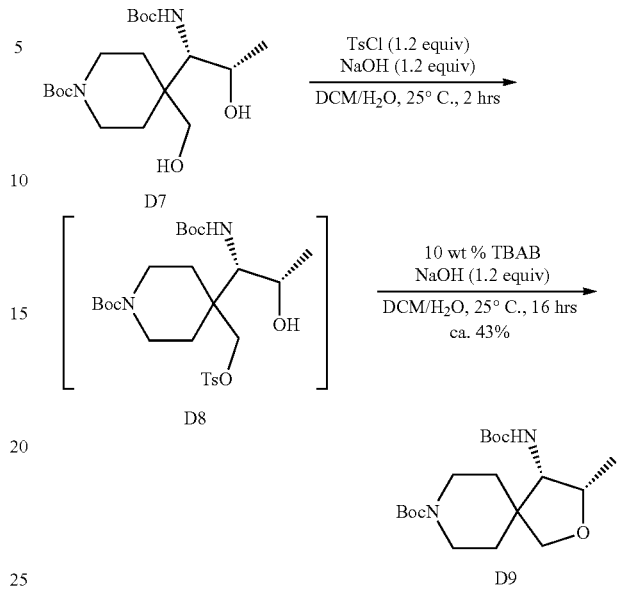

To a 25 mL Schlenk tube under a nitrogen atmosphere was added NaOH (14 mg, 0.34 mmol) and water (2.0 mL). The tube was cooled in an ice-water bath and a solution of tert-butyl 4-((1S,2S)-1-((tert-butoxycarbonyl)amino)-2-hydroxypropyl)-4-(hydroxymethyl)piperidine-1-carboxylate D7 (110 mg, 0.283 mmol) and TsCl (65 mg, 0.34 mmol) in DCM (2.0 mL) was added dropwise. The mixture was then stirred for 16 hrs at 20-25° C. n-Bu$_4$NBr (9.1 mg, 0.028 mmol) was added followed by NaOH (14 mg, 0.34 mmol) in water (1.0 mL). The mixture was then stirred for 16 hrs at 20-25° C. The organic layer was separated, washed with 20 wt % brine (2 mL), dried over Na$_2$SO$_4$ and filtered. The filtrate was evaporated to dryness to give D9 as a colorless oil (45 mg, 43%). HRMS m/z calcd for $C_{19}H_{35}N_2O_5$ [M+H]$^+$ 371.2540, found 371.2533.

Step g:

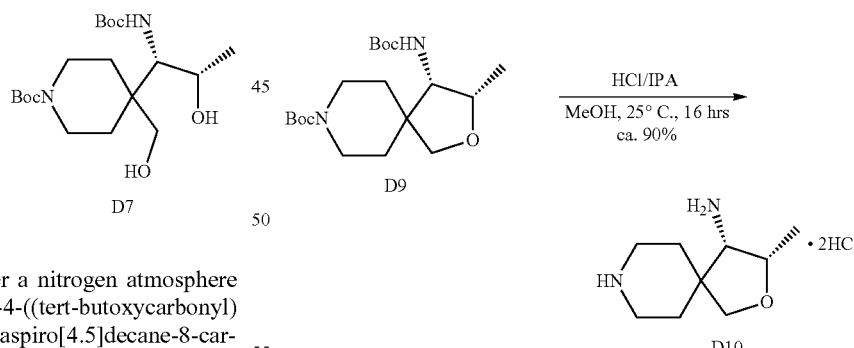

To a 10 mL Schlenk tube was added tert-butyl (3S,4S)-4-((tert-butoxycarbonyl)amino)-3-methyl-2-oxa-8-azaspiro[4.5]decane-8-carboxylate D9 (100 mg, 0.27 mmol), 6N HCl in isopropanol (1.0 mL) and methanol (3.0 mL). The reaction was stirred for 16 hrs at 20-25° C. and concentrated to dryness to give D10 as a white solid (59 mg, 90%). $^1$H NMR (400 MHz, DMSO-d$_6$) δ=9.37 (br s, 1H), 9.25 (br s, 1H), 8.42 (br s, 3H), 4.26-4.17 (m, 1H), 3.72 (ABq, J=9.1 Hz, 2H), 3.50-3.41 (m, 1H), 3.28-3.18 (m, 1H), 3.18-3.09 (m, 1H), 2.99-2.74 (m, 2H), 2.07-1.63 (m, 4H), 1.22 (d, J=6.5 Hz, 3H).

Step h:

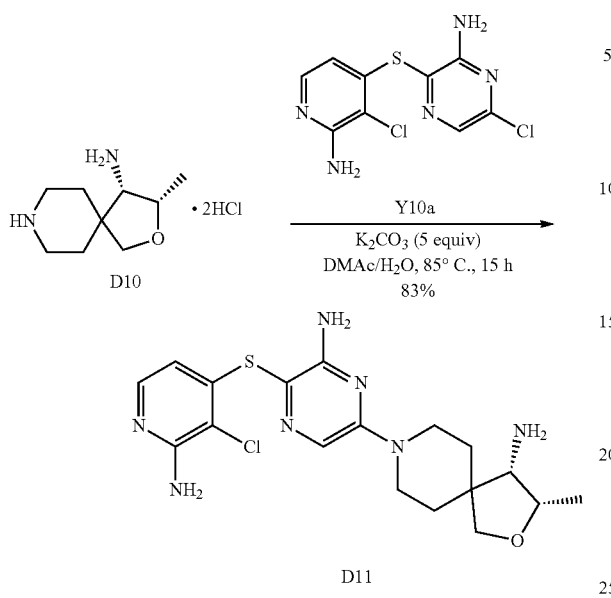

To a 10 mL Schlenk tube was added 3-((2-amino-3-chloropyridin-4-yl)thio)-6-chloropyrazin-2-amine Y10a (0.1 g, 0.347 mmol), (3S,4S)-3-methyl-2-oxa-8-azaspiro[4.5]decan-4-amine dihydrochloride D10 (0.1 g, 0.416 mmol, 1.2 eq), DMAc (0.6 mL) and 36 wt % aq. $K_2CO_3$ (0.66 g, 1.735 mmol, 5.0 eq). The mixture was stirred for 16 hrs in a 100° C. oil bath and cooled to 20-25° C. 20 wt % Brine (10 mL) was added and the mixture was extracted with EtOAc (20 mL×2). The combined extracts were washed with 20 wt % Brine (10 mL×4), dried over anhydrous $Na_2SO_4$ and filtered. The filtrate was concentrated to dryness to give D11 as a yellow solid (121 mg, 83%). $^1$H NMR (400 MHz, DMSO-$d_6$) δ=7.64 (d, J=6.2 Hz, 1H), 7.62 (s, 1H), 6.26 (s, 2H), 6.13 (s, 2H), 5.74 (d, J=5.3 Hz, 1H), 4.12-4.02 (m, 1H), 3.90-3.78 (m, 2H), 3.67 (d, J=8.4 Hz, 1H), 3.49 (d, J=8.4 Hz, 1H), 3.33 (s, 2H), 2.91 (d, J=5.1 Hz, 1H), 1.78-1.68 (m, 1H), 1.67-1.57 (m, 1H), 1.56-1.41 (m, 2H), 1.08 (d, J=6.5 Hz, 3H).

Example 4

Alternative Route DELTA for Manufacture of D11=C11=B8

D11=C11=B8 was manufactured according to the following procedure:

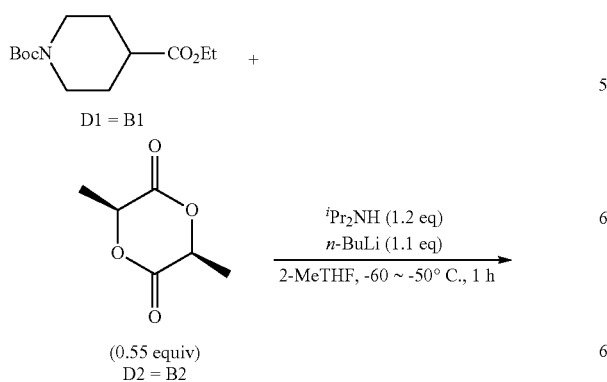

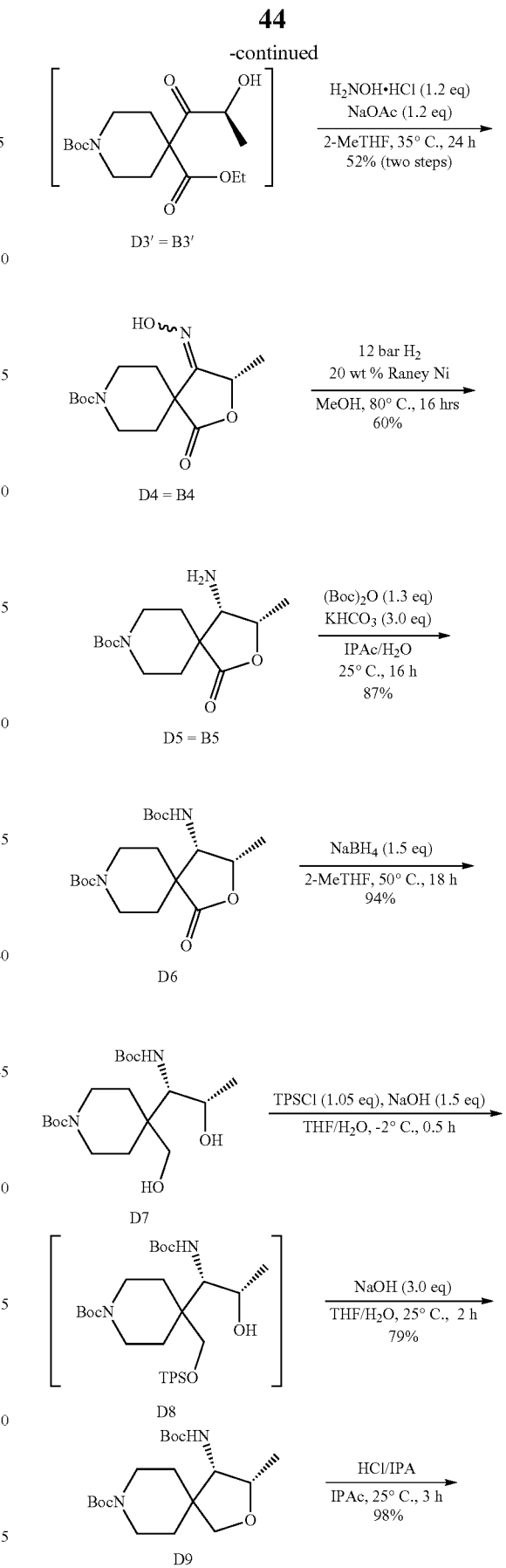

-continued

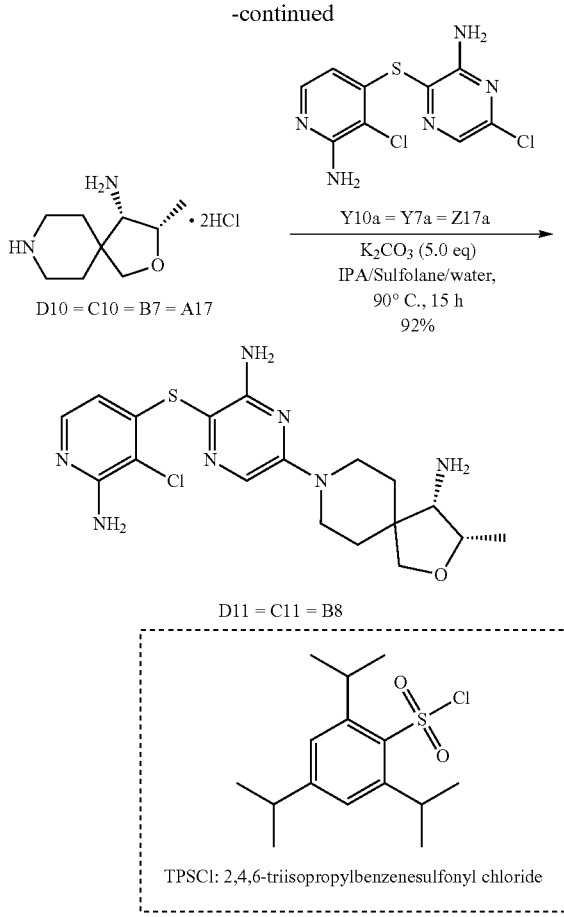

Step a and Step b are conducted as described in Example 1, Route ALFA.

Step c:

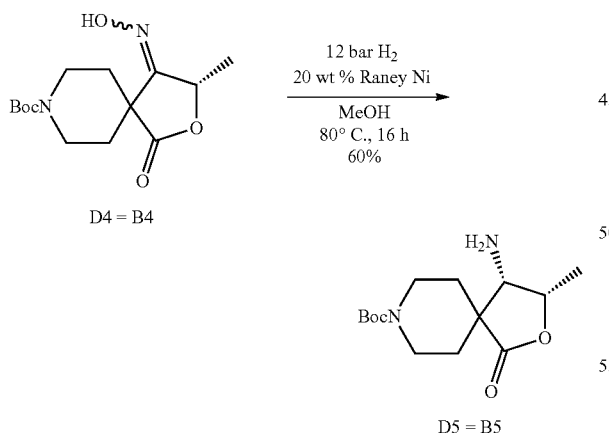

To the hydrogenation reactor was added MeOH (1643 kg, 11 V) and D4 (187.8 kg, 1.0 eq.) at rt. The reactor was replaced with nitrogen for 5 times. Raney Ni (37.6 kg) was then added to the reactor, and the reactor was replaced with hydrogen for 5 times. The reactor was heated to 45~55° C. and stirred for 1 h. Then the hydrogen pressure was adjusted to 11~13 bar, and the temperature was adjusted to 75~85° C. slowly. The reaction was stirred at 75~85° C. under 11~13 bar for 20 h. The mixture was filtered over celite, and the filter cake was washed with MeOH. The filtrate was concentrated until 2.5 w residue was left and IPA (3V) was then added. The mixture was heated to 65~75° C. and a clear solution was obtained. The solution was cooled to 50~60° C., and stirred for 1.5 h. n-Heptane (3 V) was added dropwise to the solution. The mixture was stirred for 1 h, cooled to 25~35° C. and stirred for additional 1 h. Then n-heptane (3.5 V) was added dropwise to the mixture. The mixture was cooled to 15~25° C., stirred for 6 h, and filtered. The filter cake was washed with a mixture of IPA (0.13 w) and n-heptane (0.57 w), then washed with n-heptane (2 V), and dried at 60° C. to get D5 (107 kg, 60% yield, ee=100%, de=99.2%, purity=99.5%).

Step d:

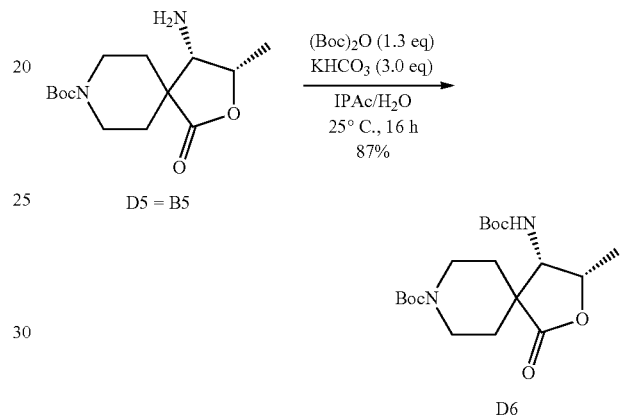

To a 1 L Radley reactor was added D5 (100 g, 352 mmol), (Boc)$_2$O (100 g, 457 mmol), IPAc (600 mL) and KHCO$_3$ (105.6 g, 1055 mmol) in water (400 mL). The mixture was stirred at 25° C. for 16 h. The organic layer was separated, washed with water (194 g) and concentrated to give a residue (400 g). The residue was heated to 45° C. and n-heptane (473 g) was added over 1 h. The mixture was cooled to 5° C., stirred for 1 h and filtered. The filter cake was washed with n-heptane (50 mL) and dried under vacuum to give D6 as a white solid (122 g, 90% yield).

Step e:

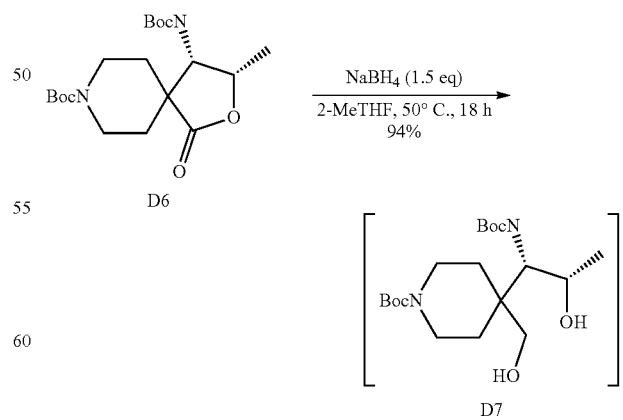

To 250 mL flexy cube reactor under N$_2$ atmosphere was added D6 (20 g, 52 mmol), NaBH$_4$ (3.0 g, 78 mmol, 1.5 eq) and 2-MeTHF (200 mL). The mixture was stirred at 50° C.

for 18 h and then cooled to 5° C. MeOH (8.8 g, 0.5 V) was added and stirred for 10 min. 20 wt % aq. Citric acid (81.8 g) was added and the mixture was separated. The organic layer was washed with 0.5 wt % aq. NaOH (81 g×2) and then with 20 wt % aq. NaCl (83 g). The organic layer was filtered through MCC, concentrated and swapped with THF to give D7 in THF (61.8 g, 31.7 wt %, 96% yield), which was used directly in the next step.

Step f:

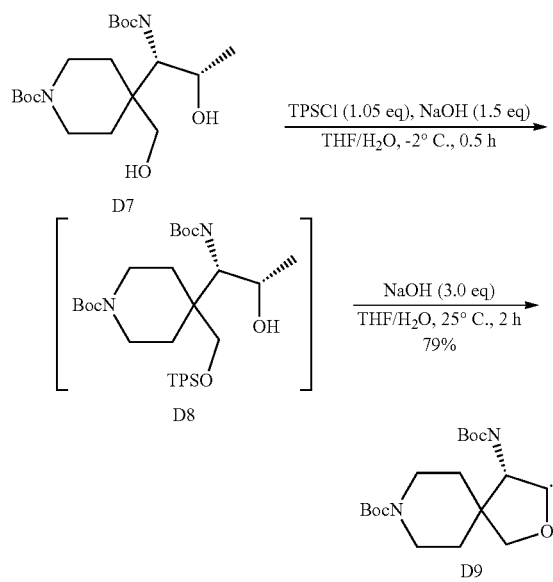

To a 250 mL Radley reactor was added 5 wt % aq. NaOH (61.1 g). The solution was cooled to −2±5° C. D7 in THF (61.1 g, 32.7 wt %) was added. A solution of TPSCl (16.37 g) in THF (50 mL) was then added in 1 h. The reaction was stirred for 30 min at −2±5° C. to give full conversion into D8. Then 32 wt % aq. NaOH (19.3 g) was added slowly and the reaction mixture was heated to 25±5° C. and stirred for 4 h. The organic phase was separated and concentrated to give a residue (74 g). The residue was stirred at 50° C. for 30 min. Then water (160 mL) was added over 2 h at 50° C. The mixture was cooled to 20° C. over 2 h, stirred for 1 h at 20° C. and filtered. The filter cake was washed with water (40 mL×2) and transferred to a 250 mL Radley reactor. MTBE (140 mL) and 5 wt % NaCl (40 mL) was added. The mixture was stirred for 0.5 h and separated. The organic phase was distilled to give a residue (37 g). The residue was stirred at 50° C. for 0.5 h. n-Heptane (160 mL) was added dropwise over 2 h. The mixture was cooled to 0° C. over 2 h, stirred for 1 h at 0° C. and filtered. The filter cake was washed with n-heptane (40 mL) and dried to give D9 as a white solid (15 g, 79% yield).

Step g:

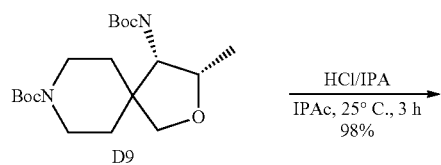

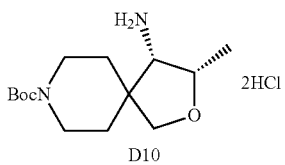

To a 250 mL flexy cube reactor was added D9 (20 g, 54 mmol) and IPAc (120 mL). HCl in IPA (28 wt %, 54 g) was added over 1 h. The reaction mixture was then stirred for 3 h and filtered. The filter cake was washed with IPAc and dried to give D10 as a white solid (14 g, 98% yield).

Step h:

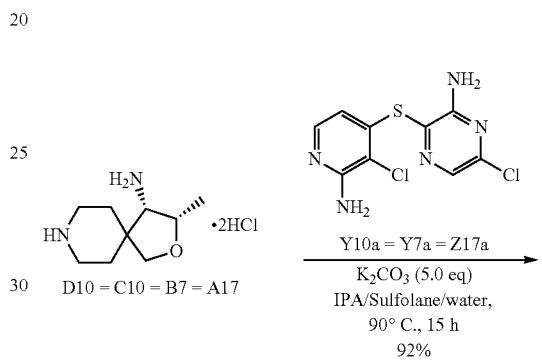

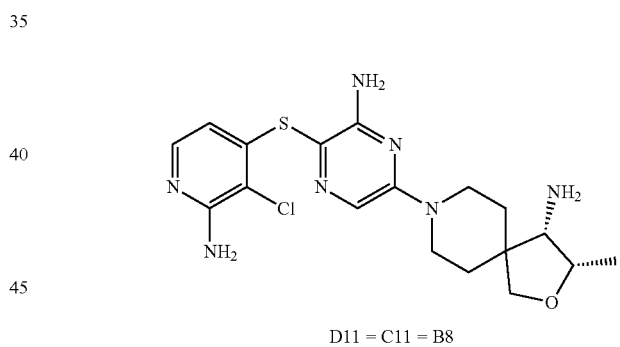

To a 250 mL flexy cube reactor was added Y10a (10 g, 34.7 mmol), IPA (40 mL), water (30 mL), sulfolane (10 mL), D10 (10.5 g, 41.6 mmol) and then K₂CO₃ (24 g, 173.5 mmol). The mixture was heated to 90° C. and stirred for 15 h. Water (30 g) was charged and the mixture was stirred for 30 min at 90° C., then cooled to 50° C. THF (20 mL) was added and the mixture was stirred for 30 min at 50° C. The organic phase was separated at 50° C. and then concentrated under vacuum at 75° C. to give a residue (40 g). Water (10 g) was charged at 75° C. and the solution was stirred for 30 min. Seeds (100 mg) was added and stirred for 2 h at 75° C. Water (70 g) was charged over 2 h at 75° C. The mixture was cooled to 20° C. over 3 h and stirred at 20° C. for 3 h, then filtered. The filter cake was washed with water (20 mL×3) and dried to give D11 as a beige solid (13.7 g, 92% yield, 99.9% purity).

Example 4

Synthesis of Compound Y7a=Z17a

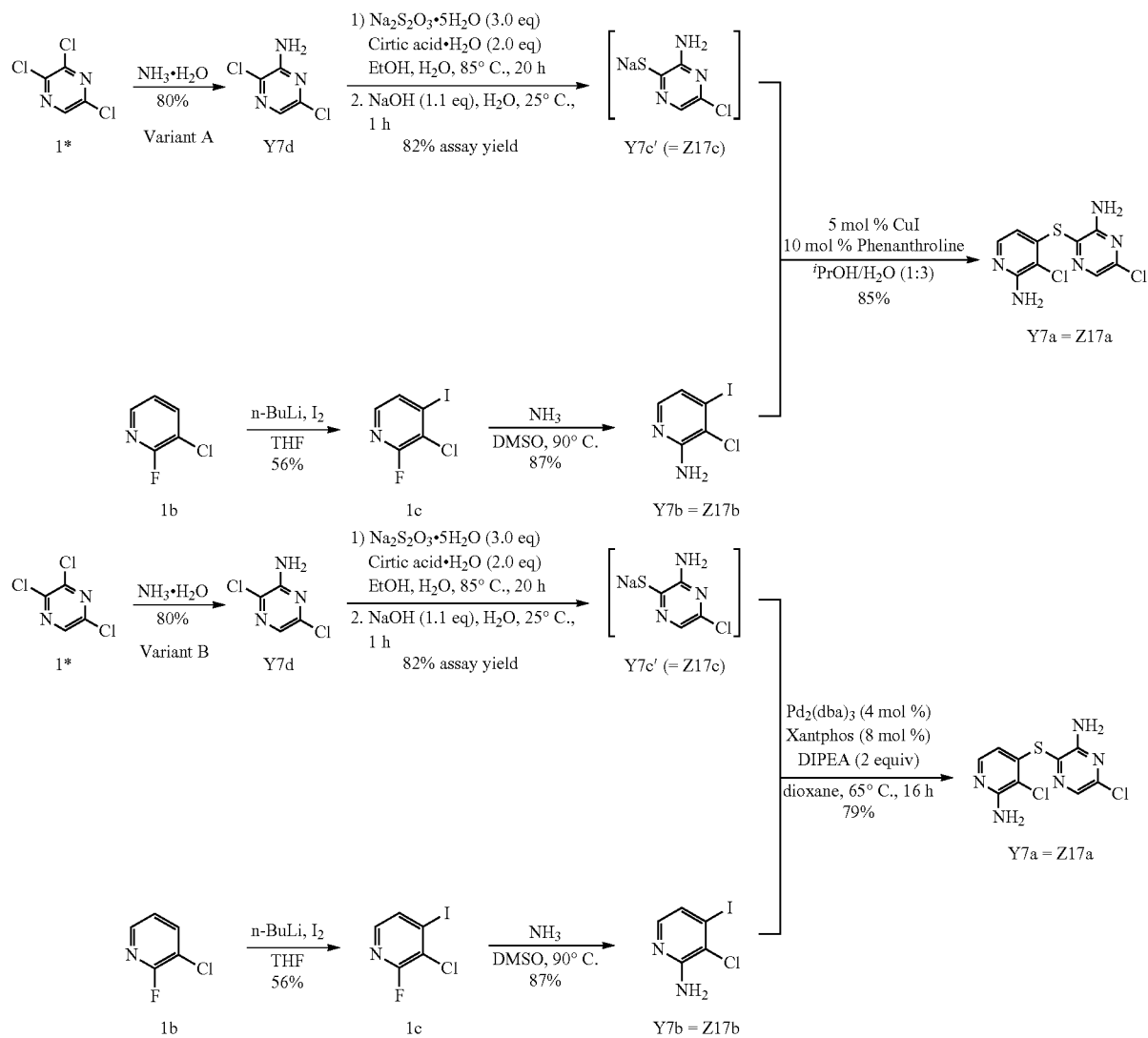

The reaction steps are conducted as follows:

Step a (for variants A and B): 2,3,5-trichloropyrazine (70.50 g, 384.36 mmol, 1 equiv) and ammonia solution (25% wt, 364.00 g, 400 mL, 2.68 mol, 6.14 equiv) were added to a 1-L sealed reactor. The mixture was heated to 80° C. and stirred for 24 h, and the reaction was completed. The reaction mixture was cooled to 30° C. and filtered to give a brown filter cake. The brown filter cake was dissolved in acetone (50 mL), and filtered. To the filtrate was added petroleum ether (300 mL). The suspension was stirred for 4 h, and filtered to give the crude product. The crude product was slurried in combined solvents of petroleum ether and acetone (10/1, 200 mL) and filtered to give the product Y7d (51.00 g, 307.91 mmol, 80% yield) as a light yellow solid. 1H NMR (400 MHz, DMSO-d6) δ=7.63 (s, 1H). The advantage of this (also generalized) method is that no column chromatography is required to obtain Y7d.

Step b (for Variants A and B) (Also a Preferred Invention Embodiment on its Own):

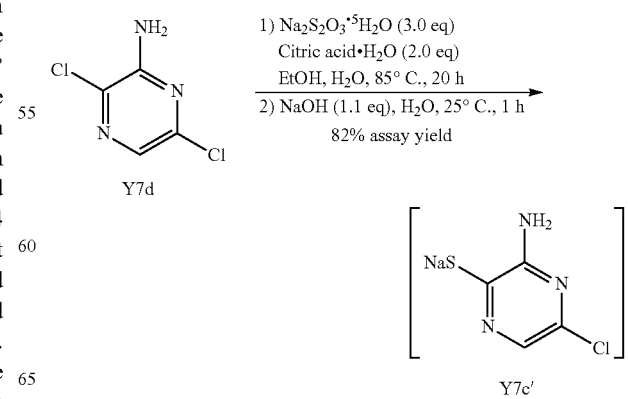

The transformation was demonstrated in the kilo-lab, the detailed experimental procedure is described by the following:

To a 100 L reactor with an impellor stirrer under a nitrogen atmosphere was added Y7d (3.2 kg, 19.5 mol), EtOH (20 L), water (13 L) and citric acid monohydrate (4.1 kg, 19.5 mol). The brown suspension was heated to IT=75±5° C. to give a clear dark solution. 35 wt % aq. $Na_2S_2O_3 \cdot 5H_2O$ (20.8 kg, 29.3 mol) was added in 1 h at IT=75±5° C. and the resulting yellow suspension was stirred for 2 h at this temperature. A solution of citric acid monohydrate (4.1 kg, 19.5 mol) in water (7.4 L) was added slowly and then 35 wt % aq. $Na_2S_2O_3 \cdot 5H_2O$ (20.8 kg, 29.3 mol) was added in 1 h at IT=75±5° C. The yellow suspension was stirred at IT=75±5° C. for 15 h, cooled to IT=25±5° C. and filtered. The filter cake was washed with water (16 L) and transferred to another reactor under a nitrogen atmosphere. 10.5 wt % aq. NaOH (8.3 kg, 21.8 mol) was then added slowly, the resulting yellow suspension was stirred at IT=25±5° C. for 1 h and filtered. The filter cake was washed with water (6.4 kg). The filtrate was obtained as a brown aqueous solution of Y7c' (25.4 kg, 11.6 wt %, 99.5% HPLC purity, 82% yield) which was used directly in the next step. $^1$H NMR (400 MHz, $D_2O$) δ=7.37 (s, 1H).

Step c (for Variants A and B):

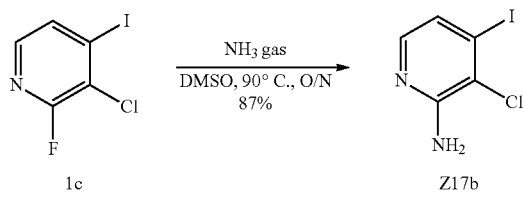

1b
MW: 131.53

1c
MW: 257.43

Under nitrogen atmosphere, n-BuLi (2.5M, 7.6 L) was added dropwise to a solution of 3-chloro-2-fluoropyridine (2 kg) in THF (15 L) at −78° C. Then the resultant mixture was stirred for 1 h. Then a solution of $I_2$ (4.82 kg) in THF (6 L) was added dropwise. After addition, the reaction mixture was stirred for 30 min, and then quenched with sat. $Na_2SO_3$ (10 L), and warmed to 20-25° C. Phase was separated. The aqueous phase was extracted with EA (2×10 L). The combined organic phase was washed with sat·$Na_2SO_3$ (2×8 L), brine (8 L), and dried over $Na_2SO_4$. The organic phase was concentrated under vacuum. The residue was slurried in MeOH (4 L), filtered, and dried to offer 3-chloro-2-fluoro-4-iodopyridine 1c (2.2 kg, yield 68%).

Step d (for Variants A and B):

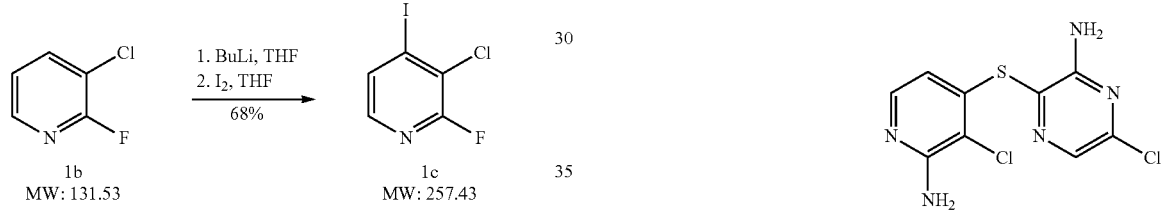

1c

Z17b

Into a solution of Compound 1c (8 kg) in DMSO (48 L) was passed through $NH_3$ (gas) at 80° C. overnight. TLC showed the reaction was finished. The reaction mixture was cooled to RT. The reaction mixture was added to water (140 L). The solid was collected and washed with water (25 L), dried to afford Z17b (=Y7b) (6.91 kg, yield 87%). $^1$H NMR (400 MHz, CDCl3) δ=7.61 (d, J=6.8 Hz, 1H), 7.14 (s, J=6.8 Hz, 1H), 5.09 (bs, 2H).

Step e (for Variant A Only):

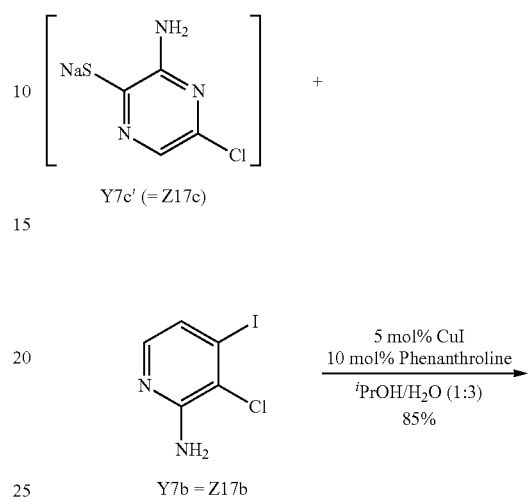

Y7c' (=Z17c)

Y7b = Z17b

Y7a = Z17a

To a 500 mL radley reactor under a nitrogen atmosphere was added Y7c' water solution (82.3 g, 12.2 wt %, 54.5 mmol), water (80 mL) and IPA (150 mL). The brown solution was degassed with nitrogen for 5 min. Citric acid monohydrate (2.29 g, 10.9 mmol) was added with stirring to get a yellow suspension. Y7b (16.6 g, 65.4 mmol), CuI (207 mg, 1.1 mmol) and 1,10-phenanthroline (393 mg, 2.2 mmol) was added subsequently. The mixture was heated to 50° C. and stirred for 5 h, then the temperature was raised to 75° C. over 3 h. The mixture was stirred at 75° C. for 18 h. The reaction was then cooled to rt and filtered. The filter cake was washed with a mixed solvent of THF/water (25 mL/25 mL) and transferred to another reactor. THF (200 mL) and water (10 mL) was added, active carbon (1 g) was then added and the mixture was stirred at 50° C. for 1 h. The mixture was then cooled to 40° C. and filtered through MCC. MCC was rinsed with a mixed solvent of THF/water (50 mL/5 mL) and the filtrate was concentrated to give a residue of 140 g. The residue was stirred at 50° C. for 0.5 h, water (150 g) was added dropwise over 1 h, the resulting suspension was cooled to 25° C. over 2 h and stirred at this temperature for 1 h. The mixture was filtered and the filter cake was washed with a mixed solvent of THF/water (25 mL/25 mL) to give a yellow solid (13.6 g, 85% yield).

Step f (for Variant B Only):

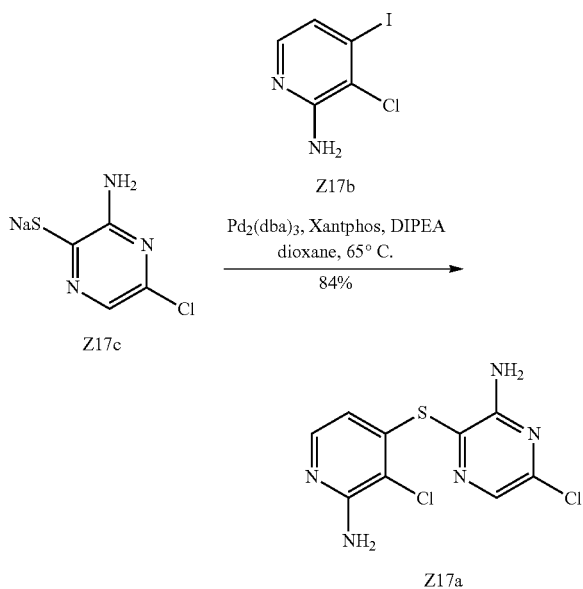

To a mixture of Z17c (6.95 kg, assay 72%, 27.23 mol) in 1,4-dioxane (72 L) was added Xantphos (233 g, 411 mmol, 0.015 eq), Pd$_2$(dba)$_3$ (186 g, 206 mmol, 0.0075 eq), Z17b (7.13 kg, 28.02 mol) and DIPEA (7.02 kg, 54.46 mol). The system was vacated and purged with nitrogen gas three times. The mixture was stirred at 65° C. for 16 h under N$_2$. The mixture was cooled to rt and water (50 L) was added, filtered. The cake was washed with EA (25 L). The filtrate was extracted with EA (4×20 L). The organic phase was concentrated in vacuum to offer the crude product which was combined with the cake. Then DCM (60 L) was added to the crude product and stirred at 25-30° C. for 18 h and then filtered. The filter cake was slurried with CH$_2$C12 (30 L) for 4 hrs and filtered. The filter cake was slurred in CH$_2$Cl$_2$ (30 L) for 16 hrs and filtered. Then the filter cake was dried in vacuum to give Z17a (9.1 kg, 84%) as light yellow solid. $^1$H NMR (400 MHz, DMSO-d6) δ=7.89 (s, 1H), 7.7 (d, J=7.6 Hz, 1H), 7.18 (bs, 2H), 6.40 (bs, 2H), 5.97 (d, J=7.6 Hz, 1H) Alternative Route for the Manufacture of Compound Z17a=Y7a=Y10a:

This (as such also inventive) route is conducted as follows:

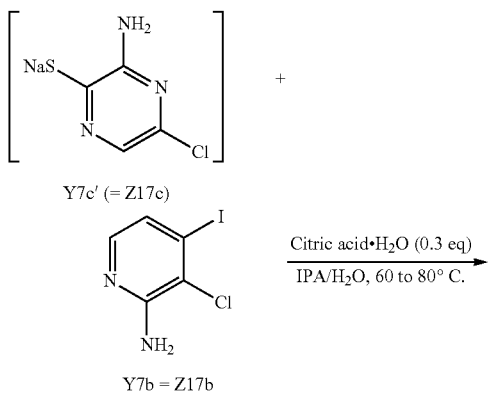

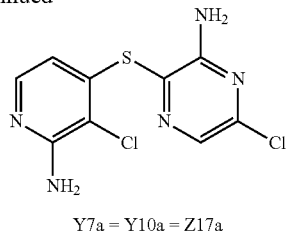

This reaction was successfully scaled up in a pilot plant on 50 kg scale, and the detailed experimental procedure is as follows:

To a 1 L radley reactor under a nitrogen atmosphere was added Y7c' in water solution (258.6 g, 11.6 wt %, 163.4 mmol), water (240 mL) and isopropanol (450 mL). The brown solution was degassed with nitrogen for 10 min. Y7b (49.8 g, 196.1 mmol) and citric acid monohydrate (10.3 g, 49.0 mmol) were added with stirring, resulting in a yellow suspension. The mixture was heated to 60° C. and stirred for 5 h, then the temperature was raised to 80° C. over 3 h. The mixture was stirred at 80° C. for 18 h. The reaction was then cooled to rt and filtered. The filter cake was washed with a mixed solvent of THF/water (75 mL/75 mL) and transferred to another reactor. THF (750 mL) and water (75 mL) was added, and the mixture was stirred at 65° C. for 1 h. The mixture was then cooled to 25° C. and filtered through MCC. MCC was rinsed with a mixed solvent of THF/water (60 mL/6 mL) and the filtrate was concentrated to give a residue of 420 g. The residue was stirred at 65° C. for 0.5 h, water (450 g) was added dropwise over 2 h, the resulting suspension was cooled to 10° C. over 2 h and stirred at this temperature for 1 h. The mixture was filtered and the filter cake was washed with a mixed solvent of THF/water (75 mL/75 mL) to give compound Y7a=Y10a=Z17a as yellow solid (42.2 g, 89% yield).

We claim:

1. A method for the manufacture of a compound of Formula I, or a pharmaceutically acceptable salt, acid co-crystal, hydrate or other solvate thereof, said method comprising reacting a compound of formula II with a compound of formula III according to the following reaction scheme:

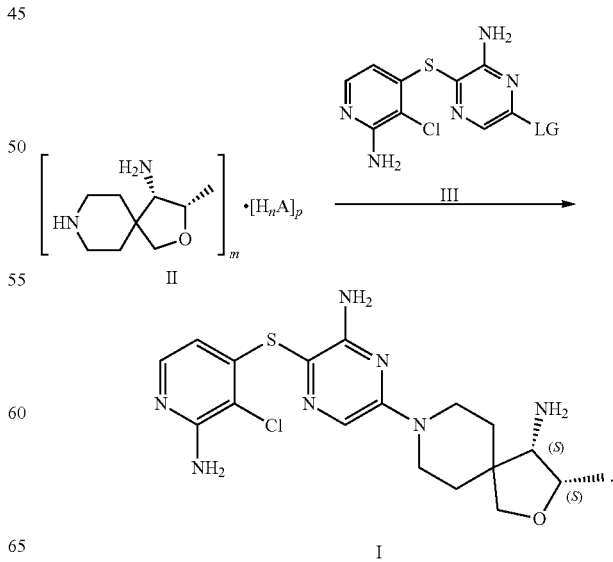

wherein LG is a leaving group, A is the anion of a protic acid, and n, m and p are independently 1, 2 or 3, so that the salt of the compound of formula II is electrically neutral, wherein the compound of formula II is manufactured in a method comprising reacting a compound of the formula V:

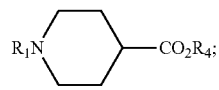
V wherein $R_1$ is a secondary amino protecting group and $R_4$ is a carboxyl protecting group, in the presence of a strong base with L lactide of the formula:

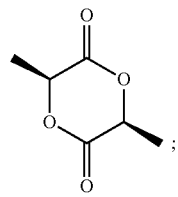

to yield a compound of the formula VI:

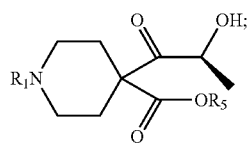
VI wherein $R_1$ is a secondary amino protecting group and $R_5$ is unsubstituted or substituted alkyl, unsubstituted or substituted cycloalkyl or unsubstituted or substituted aryl, and
cyclizing the compound of formula VI with hydroxylamine, or a salt thereof, respectively, to yield a hydroxylamine compound of the formula VII:

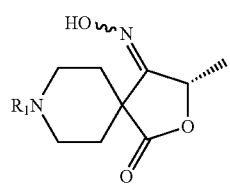
VII wherein $R_1$ is a secondary amino protecting group.

2. The method according to claim 1, further comprising hydrogenating the compound of the formula VII to yield an amino compound of the formula VIII:

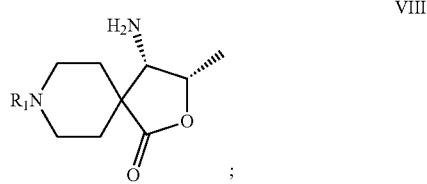
VIII wherein $R_1$ is a secondary amino protecting group, which compound of the formula VIII is then either:

(b-i) reduced to yield a compound of the formula IX:

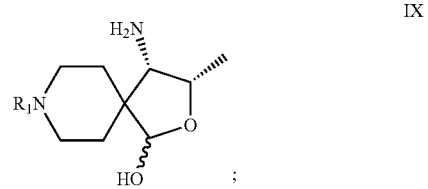
IX wherein $R_1$ is a secondary amino protecting group, which compound is a compound of the formula IV:

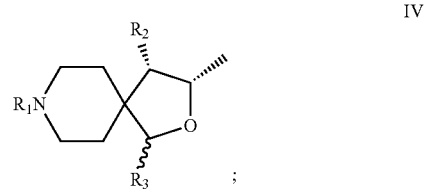
IV wherein $R_1$ is a secondary amino protecting group, $R_2$ is amino and $R_3$ is hydroxyl, which is then reduced in a further step using a trialkylsilane to yield, after subsequent addition of an acid of the formula $H_nA$ wherein A is an acid anion and n is 1, 2 or 3, the compound of the formula II; or (c-i) the compound of the formula VIII is reacted with an amino protecting group inserting compound to yield a compound of the formula X:

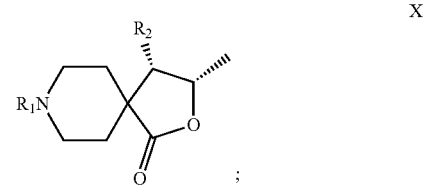
X wherein $R_1$ is a secondary amino protecting group and $R_2$ is a protected amino group, which compound of formula X is reduced to a compound of the formula XI:

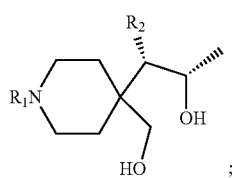

wherein $R_1$ is a secondary amino protecting group and $R_2$ is a protected amino group, which compound of formula XI is reacted at the hydroxy of the hydroxymethyl group with a leaving group forming agent of the formula LG*-X wherein LG* is an electrophilic radical capable, with the hydroxy to which it is bound, of forming a leaving group LG2, and X is halogen, to yield a compound of the formula XII:

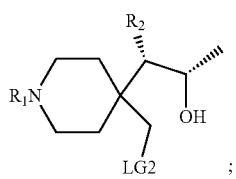

wherein $R_1$ is a secondary amino protecting group, $R_2$ is a protected amino group, and LG2 is a leaving group, which compound of formula XII is then cyclized under basic conditions to yield a compound of the formula XIII:

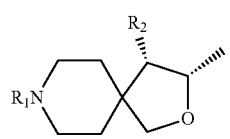

wherein $R_1$ is a secondary amino protecting group, and $R_2$ is a protected amino group, which is a compound of the formula IV wherein $R_1$ is a secondary amino protecting group, $R_2$ is a protected amino group and $R_3$ is hydrogen, followed by a deprotecting step of the compound of formula XIII which is conducted using an acid $H_nA$ wherein A is the anion of a protic acid and n is 1, 2 or 3, to yield the compound of the formula II.

3. The method according to claim 1, further comprising acylating the compound of the formula VII under reducing conditions to yield a compound of the formula VIII*:

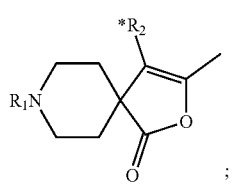

wherein $R_1$ is a secondary amino protecting group and *$R_2$ is acylated amino; followed by hydrogenating the compound of the formula VIII* in the presence of a chiral hydrogenation catalyst to yield a compound of the formula X*:

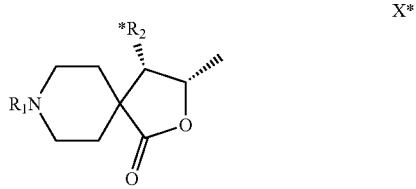

wherein $R_1$ is a secondary amino protecting group and *$R_2$ is an acylated amino group, followed by reducing the compound of the formula X* to a compound of the formula XI*:

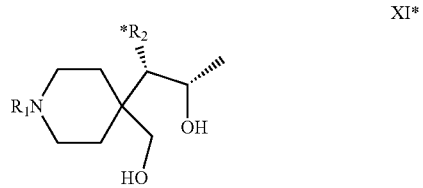

wherein $R_1$ is a secondary amino protecting group and *$R_2$ is an acylated amino group;

reacting the compound of the formula XI* at the hydroxy of the hydroxymethyl group with a leaving group forming agent of the formula LG*-X wherein LG* is an electrophilic radical capable of forming, with the hydroxy to which it is bound, a leaving group LG2, to yield a compound of the formula XII*:

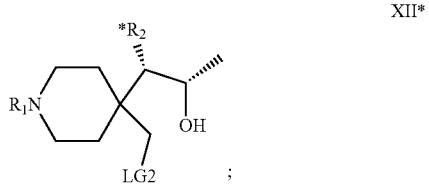

wherein $R_1$ is a secondary amino protecting group, $R_2$ is a protected amino group, and LG2 is a leaving group, and then cyclizing the compound of formula XII* under basic conditions to yield a compound of the formula XIII*:

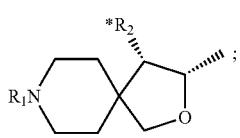

wherein $R_1$ is a secondary amino protecting group and *$R_2$ is an acylated amino group, wherein the compound of XIII* corresponds to a compound of the formula IV:

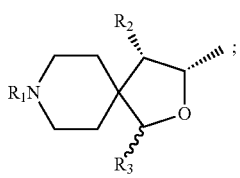

IV wherein $R_1$ is a secondary amino protecting group, $R_2$ is an acylated amino group and $R_3$ is hydrogen, followed by deprotecting the compound of formula XIII* with an acid $H_nA$ wherein A is the anion of a protic acid and n is 1, 2 or 3, to yield a compound of the formula II defined in claim 1.

4. A method of manufacturing a compound of the formula VI:

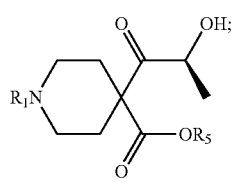

VI wherein $R_1$ is a secondary amino protecting group and $R_5$ is unsubstituted or substituted alkyl, unsubstituted or substituted cycloalkyl or unsubstituted or substituted aryl, said method comprising reacting a compound of the formula V:

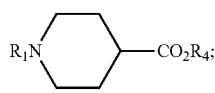

V wherein $R_1$ is a secondary amino protecting group and $R_4$ is a carboxyl protecting group, in the presence of a strong base with L lactide of the formula:

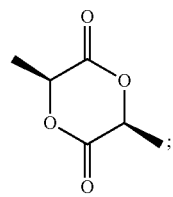

to yield the compound of the formula VI.

5. The method of claim 4, further comprising the step of cyclizing the compound of the formula VI with hydroxylamine, or a salt thereof, to yield a compound of the formula VII:

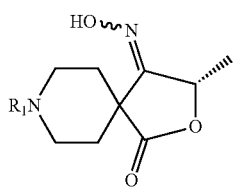

VII wherein $R_1$ is a secondary amino protecting group.

6. A compound of the formula VI:

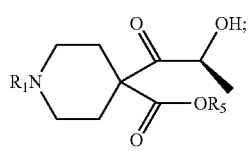

VI wherein $R_1$ is a secondary amino protecting group and $R_5$ is unsubstituted or substituted alkyl, unsubstituted or substituted cycloalkyl or unsubstituted or substituted aryl.

7. The compound of formula VI according to claim 6, wherein $R_1$ is tert-butoxycarbonyl, benzyloxycarbonyl or fluoren-9-yloxacarbonyl and $R_5$ is $C_1$-$C_8$-alkyl.

8. The compound of formula VI according to claim 6, wherein $R_1$ is tert-butoxycarbonyl and $R_5$ is ethyl.

9. A method for the manufacture of a compound of the formula XV:

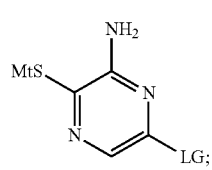

(XV)

wherein Mt is an earth alkaline metal or an alkaline metal atom, and LG is a leaving group, said method comprising reacting a compound of the formula XIV:

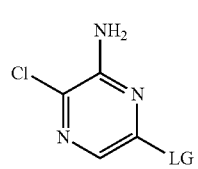

(XIV)

wherein LG is a leaving group, with an alkaline metal or earth alkaline metal thiosulfate salt, in the presence of an acid in an appropriate solvent, followed by treatment with an aqueous base.

10. The method according to claim 9, wherein Mt in formula XV is sodium and LG is chloro, and the alkaline metal or earth alkaline metal thiosulfate salt is sodium thiosulfate.

11. The method according to claim 9, wherein the compound of the formula XIV is made by reacting 2,3-5-trichloropyrazine with ammonia.

12. The method of claim 1, wherein the compound of formula III is manufactured in a method comprising:
(i) reacting a compound of the formula XIV:

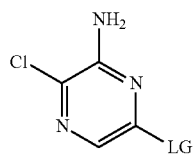
(XIV)

wherein LG is a leaving group, with an alkaline metal or earth alkaline metal thiosulfate salt in the presence of an acid in an appropriate solvent, followed by treatment with an aqueous base, to yield a compound of formula XV:

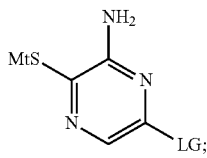
(XV)

wherein Mt is an earth alkaline metal or an alkaline metal atom, and LG is a leaving group; and
(ii) reacting the compound of formula XV with a compound of the formula XVI:

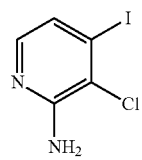
(XVI)

to yield the compound of the formula III.

* * * * *